United States Patent
Hada et al.

(10) Patent No.: US 11,616,908 B2
(45) Date of Patent: Mar. 28, 2023

(54) IMAGE PROCESSING APPARATUS AND IMAGE PROCESSING METHOD

(71) Applicants: Kabushiki Kaisha Toshiba, Tokyo (JP); Toshiba Electronic Devices & Storage Corporation, Tokyo (JP)

(72) Inventors: Ryuji Hada, Yokohama Kanagawa (JP); Atsushi Masuda, Yokohama Kanagawa (JP)

(73) Assignees: KABUSHIKI KAISHA TOSHIBA, Tokyo (JP); TOSHIBA ELECTRONIC DEVICES & STORAGE CORPORATION, Tokyo (JP)

( * ) Notice: Subject to any disclaimer, the term of this patent is extended or adjusted under 35 U.S.C. 154(b) by 0 days.

(21) Appl. No.: 17/200,407

(22) Filed: Mar. 12, 2021

(65) Prior Publication Data

US 2022/0086342 A1    Mar. 17, 2022

(30) Foreign Application Priority Data

Sep. 11, 2020    (JP) .............................. JP2020-153260

(51) Int. Cl.
| | | |
|---|---|---|
| *H04N 5/232* | (2006.01) | |
| *H04N 5/247* | (2006.01) | |
| *G06T 5/00* | (2006.01) | |
| *G06T 3/40* | (2006.01) | |
| *G06T 5/50* | (2006.01) | |
| *G06T 1/60* | (2006.01) | |

(Continued)

(52) U.S. Cl.
CPC ........... *H04N 5/23229* (2013.01); *G06T 1/60* (2013.01); *G06T 3/4015* (2013.01); *G06T 5/006* (2013.01); *G06T 5/50* (2013.01); *H04N 5/2258* (2013.01); *H04N 5/247* (2013.01); *H04N 9/09* (2013.01); *G06T 2207/10024* (2013.01)

(58) Field of Classification Search
None
See application file for complete search history.

(56) References Cited

U.S. PATENT DOCUMENTS

| | | |
|---|---|---|
| 7,027,085 B2 | 4/2006 | Watanabe |
| 7,969,473 B2 | 6/2011 | Kotoda |
| | (Continued) | |

FOREIGN PATENT DOCUMENTS

| | | |
|---|---|---|
| JP | 2003-158659 A | 5/2003 |
| JP | 2007-208781 A | 8/2007 |
| | (Continued) | |

OTHER PUBLICATIONS

Sungchan Oh, et al. "An architecture for on-the-fly correction of radial distortion using FPGA," Proceedings of SPIE SPIEDigitalLibrary. org/conference-proceedings-of-spie; SPIE-IS&T/vol. 6811, May 24, 2018, pp. 1-10.

*Primary Examiner* — Quan Pham
(74) *Attorney, Agent, or Firm* — Allen & Overy LLP

(57) ABSTRACT

An image processing apparatus according to an embodiment includes a preprocessing circuit and a distortion correction circuit configured to process, in a time division manner, a plurality of images generated by a plurality of image pickup units and an output buffer circuit configured to buffer the processed plurality of images in a unit of a block and add an identification tag including an address and an identification ID to the block.

6 Claims, 12 Drawing Sheets

(51) Int. Cl.
*H04N 9/09* (2006.01)
*H04N 5/225* (2006.01)

(56) References Cited

U.S. PATENT DOCUMENTS

| | | | |
|---|---|---|---|
| 8,675,225 B2 | | 3/2014 | Doi |
| 9,519,959 B2 | * | 12/2016 | Ohara .................... G06T 5/10 |
| 10,652,487 B2 | | 5/2020 | Hada |
| 10,659,746 B2 | | 5/2020 | Hada et al. |
| 2010/0177585 A1 | * | 7/2010 | Rubinstein ............ G11C 19/00 |
| | | | 710/242 |
| 2017/0180656 A1 | * | 6/2017 | Lee .................... H04N 5/217 |
| 2020/0092467 A1 | | 3/2020 | Hada et al. |
| 2020/0294208 A1 | | 9/2020 | Hada |
| 2021/0067688 A1 | | 3/2021 | Hada |

FOREIGN PATENT DOCUMENTS

| | | |
|---|---|---|
| JP | 2008-227562 A | 9/2008 |
| JP | 2008-227967 A | 9/2008 |
| JP | 5567790 B2 | 8/2014 |
| JP | 5930276 B2 | 6/2016 |
| JP | 2018-124968 A | 8/2018 |
| JP | 2019-160063 A | 9/2019 |
| JP | 2020-046817 A | 3/2020 |
| JP | 2020-149473 A | 9/2020 |
| JP | 2021-034997 A | 3/2021 |

\* cited by examiner

FIG. 15
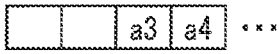
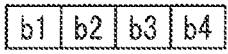
FIG. 16
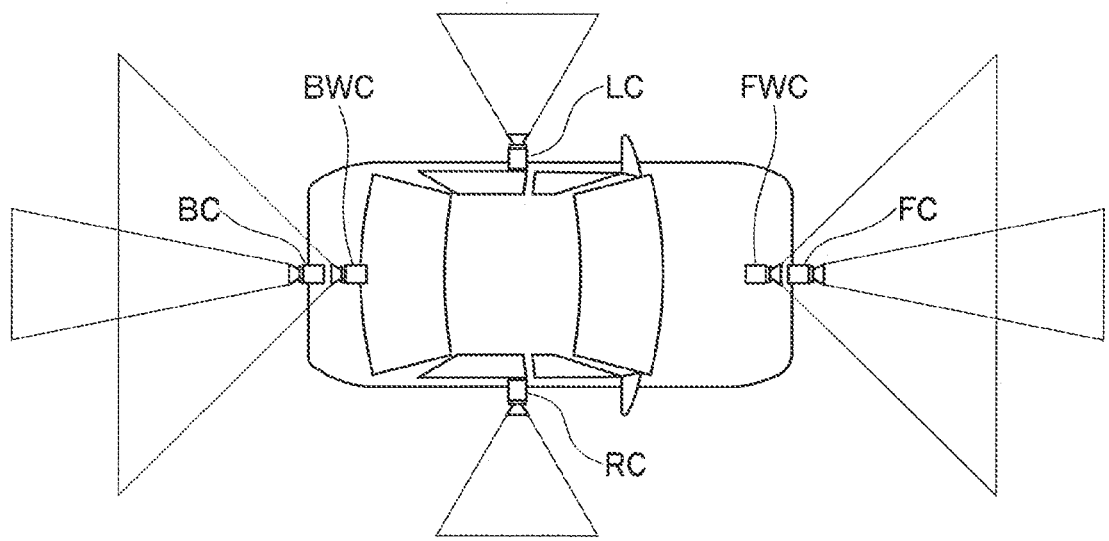

IMAGE PROCESSING APPARATUS AND IMAGE PROCESSING METHOD

CROSS REFERENCE TO RELATED APPLICATION

This application is based upon and claims the benefit of priority from the prior Japanese Patent Application No. 2020-153260 filed in Japan on Sep. 11, 2020; the entire contents of which are incorporated herein by reference.

FIELD

Embodiments relate to an image processing apparatus and an image processing method.

BACKGROUND

In general, an image obtained by picking up an image of an object with an image pickup apparatus such as a digital camera is affected by a distortion aberration and a chromatic aberration of magnification of an optical system such as an image pickup lens. For example, when the image obtained by the image pickup apparatus is used for collision prevention for an automobile or used in a surveillance camera, a super wide angle lens is sometimes adopted to make it possible to view a wide range. In the super wide angle lens, compared with a lens having a narrower angle of view, the distortion aberration and the chromatic aberration of magnification tend to be large.

An optical system that suppresses the distortion aberration and the chromatic aberration of magnification has also been known. However, since cost of such an optical system is high, in recent years, a technique for correcting an aberration with image processing has been used.

When image processing by an image processing circuit is performed through a DRAM, a frame delay, limitation of data transfer speed due to a DRAM band width, an increase in power consumption, and the like occur. Therefore, a configuration for processing pixels with pipeline processing, accumulating the pixels in an output buffer circuit, and transferring the pixels from the output buffer circuit to the DRAM has been adopted.

Incidentally, in a vehicle-mounted camera or the like in recent years, for example, as shown in FIG. 16, a plurality of kinds of image pickup units having different angles of view and numbers of pixels such as a 4 k camera FWC that photographs a front at a wide angle, a 2 k camera FC that photographs the front in a narrow angle, a 4 k camera RC that photographs a right side at a wide angle, a 4 k camera LC that photographs a left side at a wide angle, a 4 k camera BWC that photographs a rear at a wide angle, and a 2 k camera BC that photographs the rear at a narrow angle are sometimes combined. FIG. 16 is a diagram showing a disposition example of the vehicle-mounted camera.

A plurality of image processing circuits have been provided in a one-to-one relation with a plurality of image pickup units. A plurality of output buffer circuits that accumulate pixels processed by the image processing circuits have been provided in a one-to-one relation with the plurality of image processing circuits.

In recent years, a processing ability of an image processing circuit has been improved to make it possible to process images from a plurality of image pickup units with one image processing circuit in a time division manner. A plurality of images from the plurality of image pickup units processed by the one image processing circuit in a time division manner are respectively stored in a plurality of output buffer circuits provided in a one-to-one relation with the plurality of image pickup units.

BRIEF DESCRIPTION OF THE DRAWINGS

FIG. 15 is a diagram showing an example of tag information added to sub-blocks in output buffers according to the second embodiment; and FIG. 16 is a diagram showing a disposition example of a vehicle-mounted camera.

DETAILED DESCRIPTION

An image processing apparatus according to an embodiment includes: an image processing circuit configured to process, in a time division manner, a plurality of images generated by a plurality of image pickup units; an output buffer circuit configured to buffer the plurality of images processed by the image processing circuit in a unit of a block, which is a set of pixels, pixel positions of which are continuous, in one image; and a buffer controller configured to add, to the block, tag information including an address of a specific pixel included in the block and an identification ID of one of the plurality of image pickup units that generates an image including the block.

Embodiments are explained below with reference to the drawings.

First Embodiment

Figure 1:
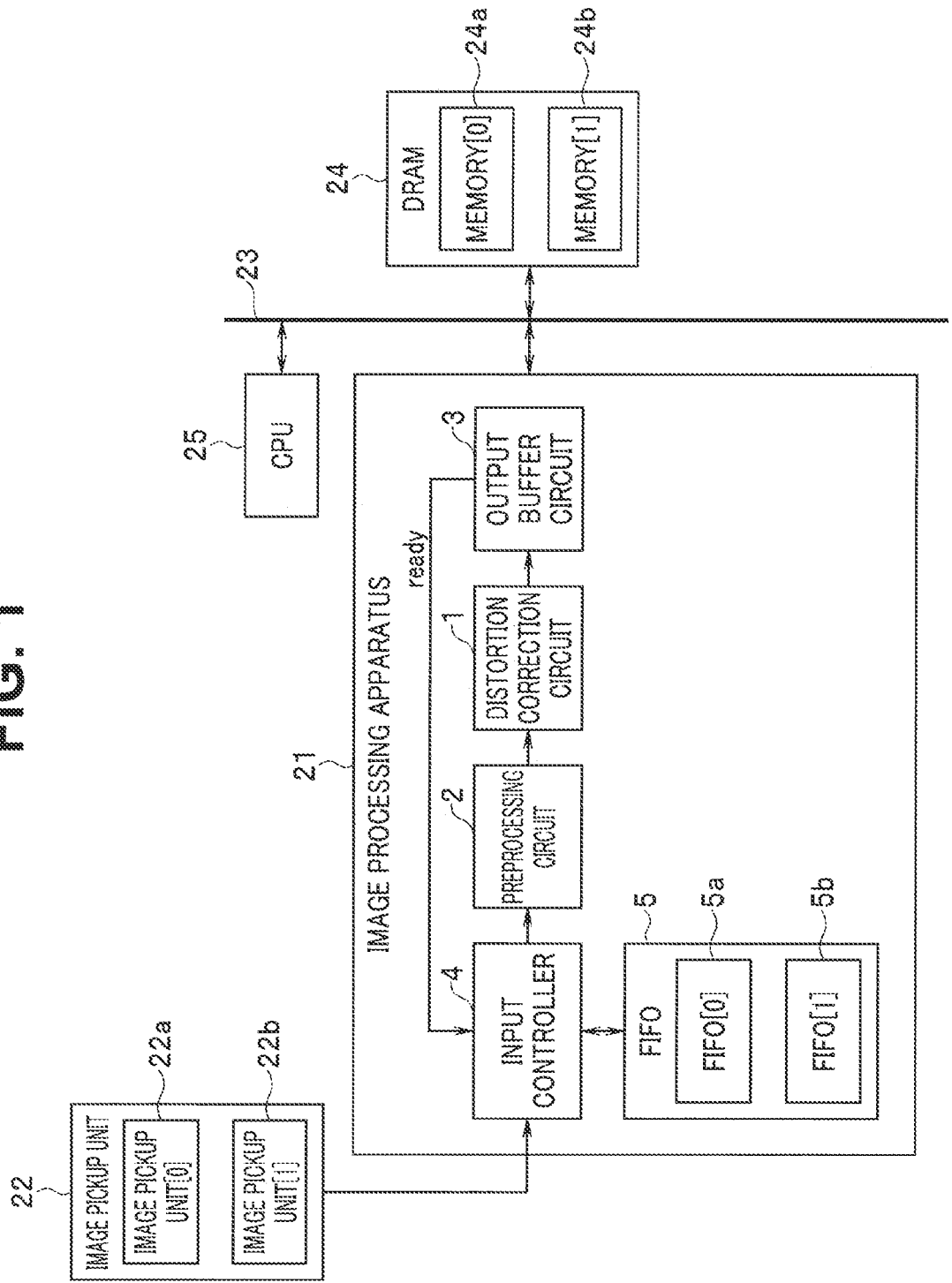
FIG. 1 is a block diagram showing a configuration of an image processing system according to the first embodiment.

FIG. 1 is a block diagram showing a configuration of an image processing system according to a first embodiment. The present embodiment adopts a raster scan input/random output for reducing a line buffer capacity in distortion correction processing. A scheme of the raster scan input/random output is disclosed in "An architecture for on-the-fly correction of radial distortion using FPGA" and "U.S. Pat. No. 8,675,225B1". About the former, a configuration of an output buffer is absent. About the latter, an output buffer scheme is a line buffer and is different from a multistage scheme and a plural camera integrated scheme of the present application. In the present embodiment, in distortion correction of the raster scan input/random output, an output buffer circuit is multilayered to enable reduction in a buffer size (capacity) and improvement of transmission efficiency. In the present embodiment, image processing including distortion correction processing is performed in a timer division manner on a plurality of images inputted from a plurality of image pickup units and the plurality of images after the image processing are stored in the output buffer circuit to enable a further reduction in the buffer size (capacity).

(Configuration)

The image processing system shown in FIG. 1 includes a CPU 25. The CPU 25 is configured to operate according to a program stored in a not-shown memory to control respective units. An image pickup unit 22 includes an image pickup unit[0]22a and an image pickup unit[1] 22b (note that [0] and [1] for distinguishing the image pickup units are omitted as appropriate when no confusion occurs even if the [0] and [1] are omitted). In FIG. 1, an example is shown in which the image pickup unit 22 includes two image pickup units 22a and 22b. However, more generally, the image pickup unit 22 may include any plurality of image pickup units if an image processing apparatus 21 is capable of performing processing.

Each of the image pickup unit 22a and the image pickup unit 22b includes a not-shown optical system and a not-shown image pickup device such as a CMOS sensor. The image pickup device includes a plurality of pixels arrayed in a row (line) direction and a column direction and a color filter of, for example, a primary color Bayer array. The image pickup device photoelectrically converts an optical image made incident via the optical system and acquires an image pickup signal (a RAW image) formed by a plurality of pixels. An image acquired by the image pickup unit 22a and an image acquired by the image pickup unit 22b have distortion due to a distortion aberration or the like of the optical system.

An output (a RAW image) of the image pickup unit 22 is inputted to the image processing apparatus 21. Image processing is performed on the output by the image processing apparatus 21. The image processing apparatus 21 includes an input controller 4, an FIFO 5, a preprocessing circuit 2, a distortion correction circuit 1, and an output buffer circuit 3.

The input controller 4 switches, line by line, an image to be inputted and inputs, line by line, a plurality of images generated by the plurality of image pickup units 22a and 22b. In other words, for example, the input controller 4 inputs pixels of one line from a first image generated by the image pickup unit 22a, subsequently inputs pixels of one line from a second image generated by the image pickup unit 22b, and subsequently inputs pixels of one line from the first image generated by the image pickup unit 22a.

The FIFO (First In First Out) 5 is connected to the input controller 4. The FIFO 5 is an input buffer circuit that buffers inputs from the plurality of image pickup units 22a and 22b. When receiving a standby signal (a ready[0] signal, a ready flag of which is 0) (an instruction signal) explained below, the input controller 4 accumulates pixels inputted from the image pickup unit 22 in the FIFO 5. When receiving a preparation completion signal (a ready[1] signal, a ready flag of which is 1), the input controller 4 reads the pixels accumulated in the FIFO 5 and outputs the pixels to the preprocessing circuit 2.

Pixels inputted from the image pickup unit 22 line by line in raster scan order are added with, according to from which of the image pickup units 22a and 22b the pixels are outputted, tag information indicating as being a line outputted from the image pickup unit 22a or tag information indicating as being a line outputted from the image pickup unit 22b. Therefore, the input controller 4 distinguishes an input and an output of the FIFO 5 according to a tag to perform the same processing as processing performed when two FIFOs, that is, an FIFO[0] 5a for the image pickup unit[0] 22a and an FIFO[1] 5b for the image pickup unit[1] 22b are provided.

The preprocessing circuit 2 and the distortion correction circuit 1 are image processing circuits that process, with pipeline processing, a plurality of images switched line by line and inputted from the input controller 4. The preprocessing circuit 2 is provided further in a pre-stage than the distortion correction circuit 1. The preprocessing circuit 2 performs demosaic processing on a RAW image, one pixel of which is formed by any one color component of RGB, and converts the RAW image into an RGB image in which three color components of RGB are present in one pixel. The preprocessing circuit 2 may perform processing such as gamma conversion according to necessity.

Note that the RAW image is formed by, for example, data, one pixel of which has 14 bits. In contrast, the RGB image is formed by data, one pixel of which has 8×3=24 bits or 16×3=48 bits. A data amount is increased by the demosaic processing. Accordingly, a reduction in a buffer capacity is achieved by providing the FIFO 5, which is an input buffer circuit, further on the pre-stage side than the preprocessing circuit 2 and configuring the FIFO 5 to store pixels of the RAW image.

h stage after the first stage is a double of the number of pixels in the case of the 16 distortion of the plurality of images outputted from the preprocessing circuit 2 and, thereafter, outputs the plurality of images to the output buffer circuit 3. More specifically, the distortion correction circuit 1 carries out, in a time division manner, performing distortion correction and chromatic aberration of magnification correction on images inputted from the image pickup unit 22a in raster scan order through the input controller 4 and the preprocessing circuit 2 and performing distortion correction and chromatic aberration of magnification correction on images inputted from the image pickup unit 22b in raster scan order through the input controller 4 and the preprocessing circuit 2. The correction processing for distortion aberration and the like by the distortion correction circuit 1 is explained in further detail below.

The output buffer circuit 3 buffers, in a unit of a block, which is a set of pixels, pixel positions of which are continuous, in one image, the plurality of images processed by the image processing circuits (the preprocessing circuit 2 and the distortion correction circuit 1). The output buffer circuit 3 couples a plurality of blocks (more specifically, sub-blocks explained below) in which all pixels are collected and outputs the plurality of blocks as a transmission block.

Figure 5:
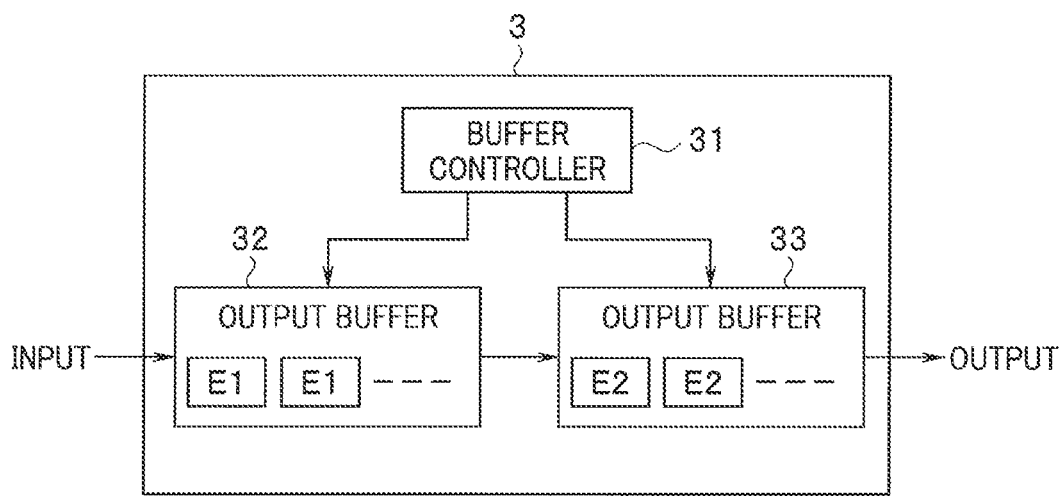
FIG. 5 is a block diagram for explaining an output buffer circuit according to the first embodiment.

The output buffer circuit 3 includes a buffer controller 31 (see FIG. 5). The buffer controller 31 adds, to the block (the sub-block or the transmission block), tag information including an address of a specific pixel (for example, a leading pixel in the block) included in the block and camera IDs (camIDs), which are identification IDs, of the image pickup units 22a and 22b that generate images including the block. Therefore, the transmission block, which is a set of a plurality of pixels, pixel positions of which are continuous, is transferred at high speed to a RAM by so-called burst transfer based on, for example, the address of the leading pixel.

The transmission block outputted from the output buffer circuit 3 of the image processing apparatus 21 is transferred to a DRAM 24 via a bus 23 and stored in the DRAM 24. According to control by the CPU 25, the DRAM 24 stores the transmission block in a memory[0] 24a, which is a storage region, when the camera ID indicates that the image is an image from the image pickup unit[0] 22a and stores the transmission block in a memory[1] 24b, which is a storage region, when the camera ID indicates that the image is an image from the image pickup unit[1] 22b. Storage addresses in the memory[0] 24a and the memory[1] 24b are controlled by the CPU 25 based on the address of the tag information.

Subsequently, the distortion correction processing for the raster scan input/random output adopted in the present embodiment is more specifically explained.

Figure 2:
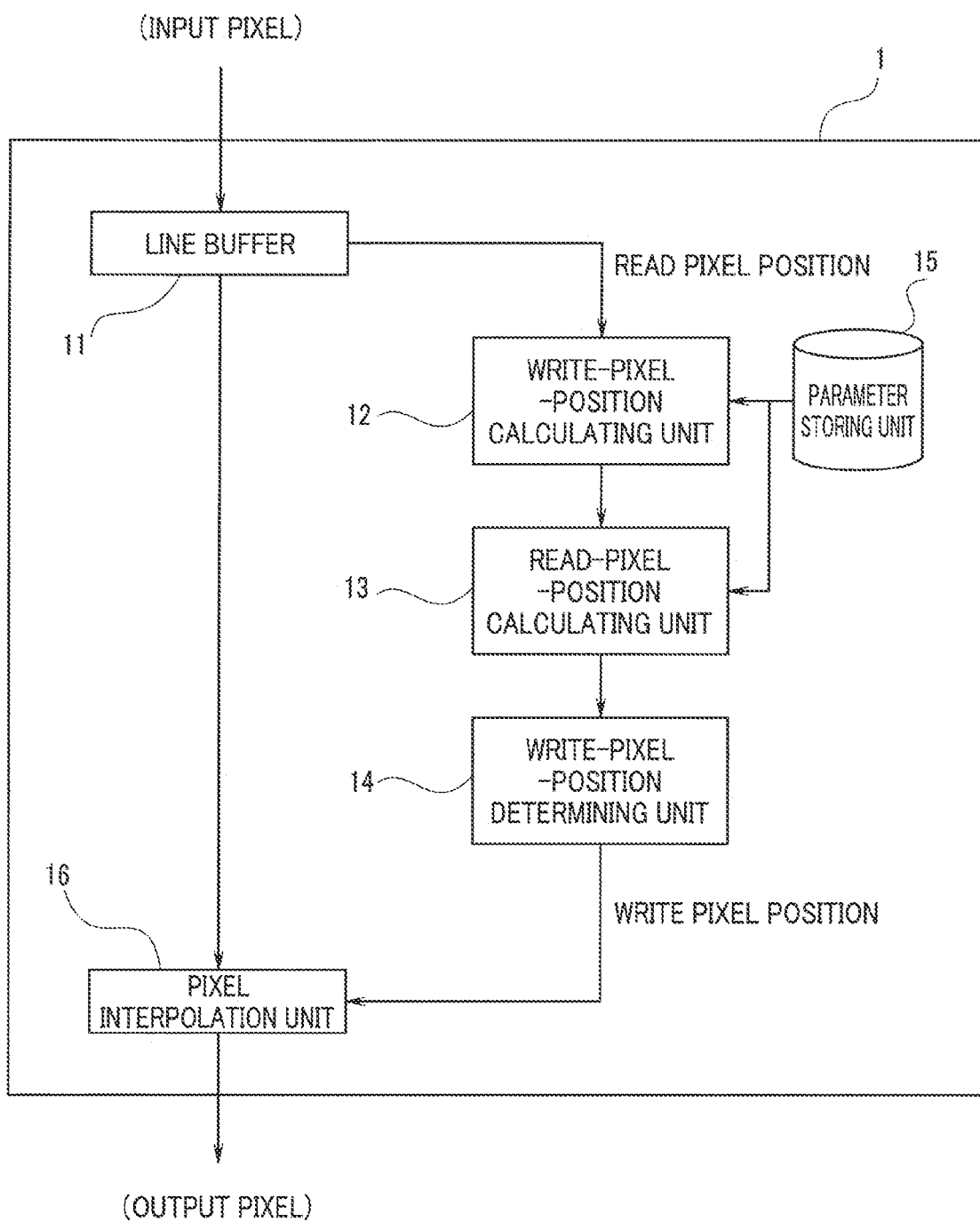
FIG. 2 is a block diagram showing an example of a configuration of a distortion correction circuit according to the first embodiment.

FIG. 2 is a block diagram showing an example of a configuration of the distortion correction circuit 1 shown in FIG. 1.

In FIG. 2, the distortion correction circuit 1 includes a line buffer 11, a write-pixel-position calculating unit 12, a read-pixel-position calculating unit 13, a write-pixel-position determining unit 14, a parameter storing unit 15, and a pixel interpolation unit 16.

The line buffer 11 retains, by the number of lines necessary for the correction processing, pixels (input pixels) of an input image read from the preprocessing circuit 2 in raster scan order. For example, when correction of a distortion aberration is performed using bilinear interpolation, the line buffer 11 retains pixels for one to two lines.

Figure 3:
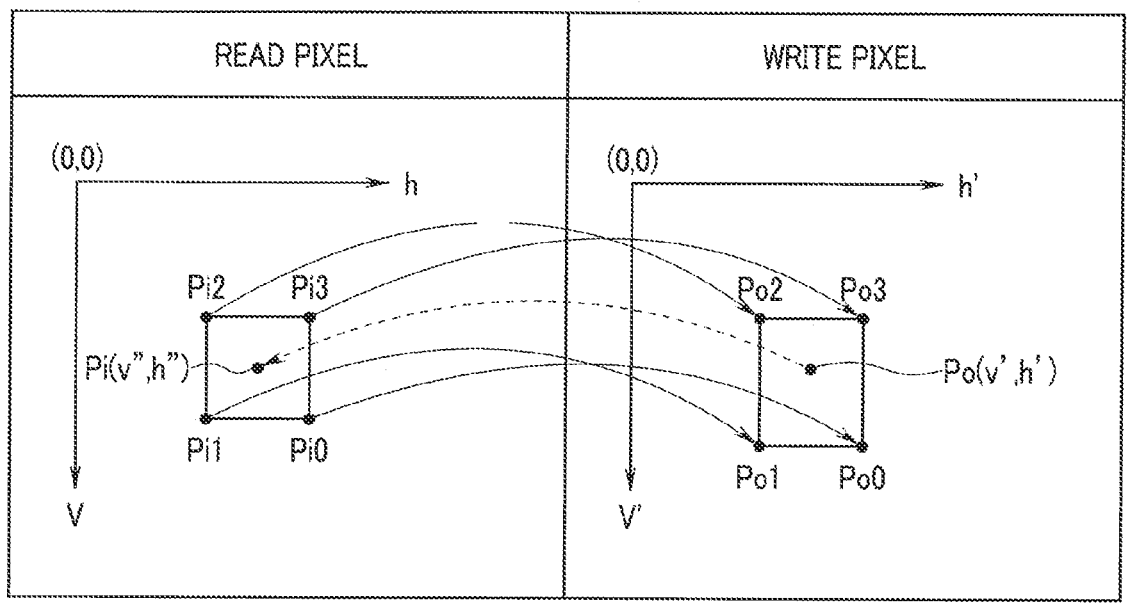
FIG. 3 is a diagram showing a correspondence relation between a read pixel and a write pixel of the distortion correction circuit according to the first embodiment.

The write-pixel-position calculating unit 12 calculates a write pixel region. The write pixel region is a region estimated as including pixels interpolated using a read pixel Pi, which is an interpolation target. More specifically, a read pixel position set formed by pixels {Pi0 (vo, ho), Pi1 (vo, ho−1), Pi2 (vo−1, ho−1), Pi3 (vo−1, ho)} at peripheral four points including a position (vo, ho) of the read pixel Pi (hereinafter described as pixel Pi (vo ho)) is defined FIG. 3 is a diagram showing a correspondence relation between a read pixel and a write pixel of the distortion correction circuit 1. Note that, in this explanation, in a pixel position coordinate (v, h), an image upper left is set an origin (0, 0) and v represents a vertical pixel position and h represents a horizontal pixel position.

About each of the read pixels Pi0, Pi1, Pi2, and Pi3, positions (vo', ho'), (vo', ho−1'), (vo−1', ho−1'), and (vo−1', ho') of write pixels Po0, Po1, Po2, and Po3 corresponding to the read pixels Pi0, Pi1, Pi2, and Pi3 are calculated using a function of pixel position calculation. A rectangular region including the pixels Po0(vo', ho'), Po1(vo', ho−1'), Po2(vo−1', ho−1'), and Po3(vo−1', ho') at the four points as vertexes is a write pixel region.

For the pixel position calculation, general functions for pixel position calculation such as a function represented by a polynomial and grid table conversion can be used. However, as the pixel position calculation function, a function, an inverse function of which is present, is used.

The read-pixel-position calculating unit 13 extracts a position of a pixel (a write pixel candidate Poc(v', h')), both of a vertical position and a horizontal position of which are integers, in the write pixel region. The read-pixel-position calculating unit 13 performs pixel position calculation to calculate a read pixel Pi(v", h") corresponding to the write pixel candidate Poc(v', h'). Note that the read-pixel-position calculating unit 13 performs the pixel position calculation using an inverse function of the pixel position calculation performed by the write-pixel-position calculating unit 12. When there are a plurality of candidates, the read-pixel-position calculating unit 13 calculates the read pixel Pi(v", h") for all candidates Poc(v', h').

When the read pixel Pi(v", h") is included in the read pixel position set, the write-pixel-position determining unit 14 decides the write pixel candidate Poc(v', h') for the pixel Pi(v", h") as a write pixel Po(v', h') in a corrected pixel position.

The parameter storing unit 15 stores parameters used for the pixel position calculation function in the write-pixel-position calculating unit 12 and the read-pixel-position calculating unit 13.

The pixel interpolation unit 16 calculates a pixel value of the read pixel Pi(v", h") corresponding to the decided write pixel Po(v', h'). Usually, since a coordinate of the read pixel Pi(v", h") is a non-integer, the pixel interpolation unit 16 calculates the pixel value using an existing interpolation method such as bilinear interpolation in which peripheral four pixels are used. The pixel interpolation unit 16 outputs the calculated pixel value of the read pixel Pi(v", h") as a pixel value of the write pixel Po(v', h'). The outputted pixel value is stored in the output buffer circuit 3. Note that, since output pixels are outputted in order of correction, positions of the output pixels (corrected pixel positions) are random.

Figure 4:
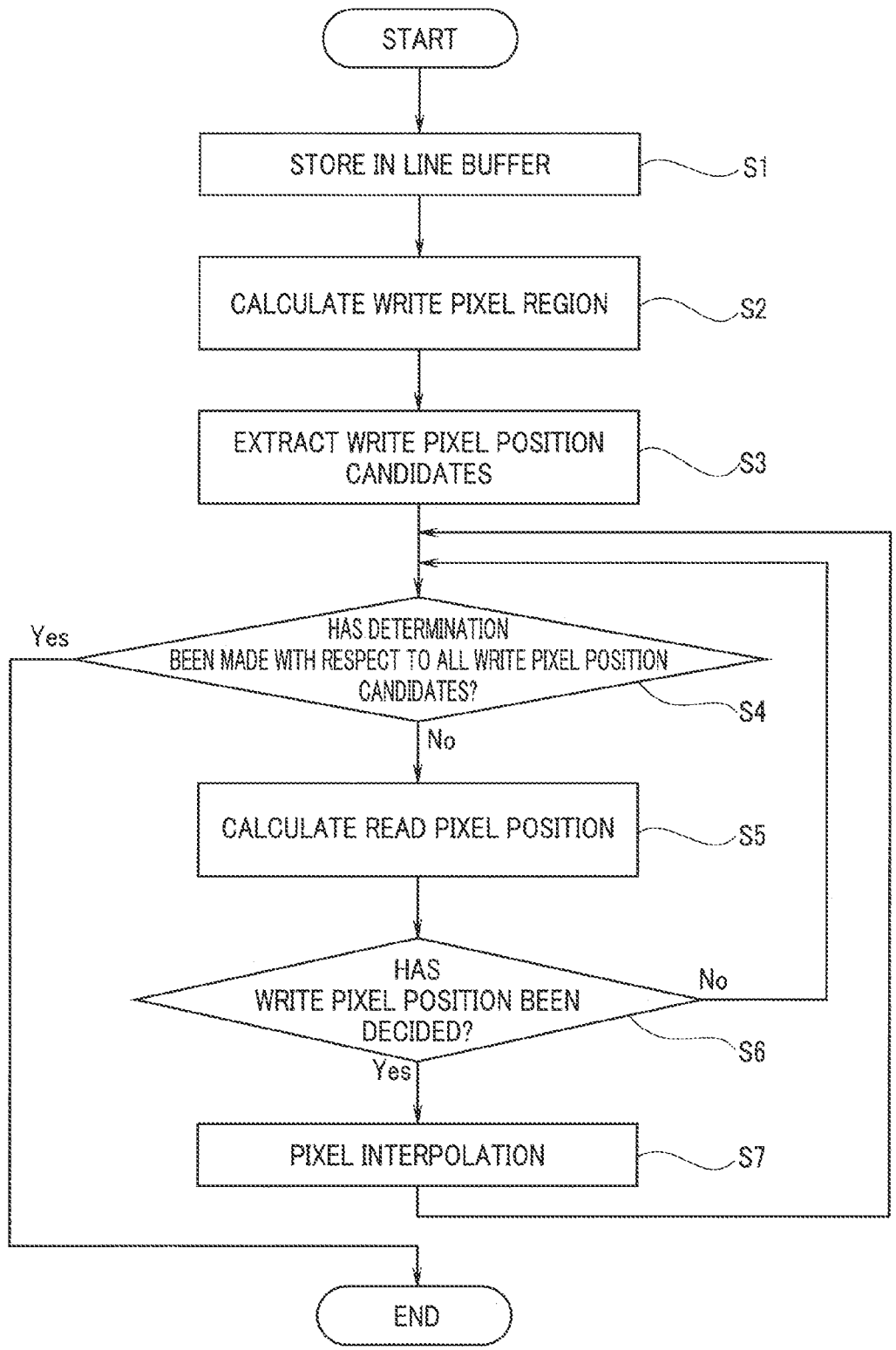
FIG. 4 is a flowchart showing image correction processing according to the first embodiment.

Subsequently, a procedure of image correction processing in the distortion correction circuit 1 is explained. FIG. 4 is a flowchart showing the image correction processing.

First, the distortion correction circuit 1 stores pixels inputted to the distortion correction circuit 1 in raster scan order in the line buffer 11 for the number of lines necessary for processing in the pixel interpolation unit 16 (step S1). For example, when the bilinear interpolation is used, since pixel values of 2×2 pixels (four pixels) around an interpolation target pixel are necessary, the distortion correction circuit 1 stores pixel values for at least 1 line+1 pixel.

Subsequently, the distortion correction circuit 1 specifies a read pixel Pi(vo, ho), which is the correction target pixel, and calculates a write pixel region estimated as including pixels interpolated using the read pixel Pi (step S2). More specifically, first, the distortion correction circuit 1 defines a read pixel position set formed by pixels {Pi0(vo, ho), Pi1(vo, ho−1), Pi2(vo−1, ho−1), Pi3(vo−1, ho)} at peripheral four points including the read pixel Pi(vo, ho). In other words, Pi1(vo, ho−1) is a pixel on a left of Pi(vo, ho), Pi2(vo−1, ho−1) is a pixel on an upper left of Pi(vo, ho), and Pi3(vo−1, ho) is a pixel above Pi(vo, ho). Subsequently, the distortion correction circuit 1 performs pixel position calculation about each of the pixels Pi0, Pi1, Pi2, and Pi3 and calculates write pixels Po0(vo', ho'), Po1(vo', ho−1'), Po2(vo−1', ho−1'), and Po3(vo−1', ho') corresponding to the pixels Pi0, Pi1, Pi2, and Pi3.

For example, when a function represented by a polynomial is used, the distortion correction circuit 1 performs the pixel position calculation in the following procedure.

(a) Calculation of an image height: The distortion correction circuit 1 converts a position of an input pixel from a coordinate system of (v, h) having an origin on an upper left into a coordinate of (x, y) having an origin in an optical center. Note that, in both the coordinate systems, a right side is positive in a horizontal direction and a lower side is positive in a vertical direction. The distortion correction circuit 1 calculates a distance (an image height) r from the optical center to the input pixel. The distortion correction circuit 1 performs the calculation using Expressions (1) to (3) described below.

$$y = v_{in} + [SENSOR\_CROP\_OFS\_V] \tag{1}$$

$$x = h_{in} + [SENSOR\_CROP\_OFS\_H] \tag{2}$$

$$r = \sqrt{x^2 + y^2} \times [NORM\_SCALE] \tag{3}$$

In Expression (1), vin is an input pixel position (a non-negative number) in the vertical direction and [SENSOR_CROP_OFS_V] is a vertical pixel position offset from the optical center (an offset in the vertical direction between the optical center and the origin of the (v, h) coordinate system). In Expression (2), hin is an input pixel position (a non-negative number) in the horizontal direction and [SENSOR_CROP_OFS_H] is a horizontal pixel position offset from the optical center (an offset in the horizontal direction between the optical center and the origin of the (v, h) coordinate system). In Expression (3), [NORM_SCALE] is a normalization coefficient (a non-negative number).

Note that when an image center and the optical center coincide, [SENSOR_CROP_OFS_V] and [SENSOR_CROP_OFS_H] are represented by the following Expressions (4) and (5).

$$[SENSOR\_CROP\_OFS\_V] = -(\text{input image vertical size}/2 - 0.5) \tag{4}$$

$$[SENSOR\_CROP\_OFS\_H] = -(\text{input image horizontal size}/2 - 0.5) \tag{5}$$

(b) Calculation of an image height scale of the pixel position calculation: The distortion correction circuit 1 calculates a distance r_scale in which a point present at a distance r from the optical center moves in an optical center direction according to pixel position conversion. The distortion correction circuit 1 performs the calculation using Expression (6) described below.

$$r\_scale = P0 + P1*r + P2*r2 + P3*r3 + P4*r4 + P5*r5 + P6*r6 + P7*r7 + P8*r8 + P9*r9 + P10*r10 \tag{6}$$

In Expression (6), Px (x=0 to 10) is a polynomial coefficient corresponding to each degree.

(c) Calculation of an output pixel position: The distortion correction circuit 1 converts the input pixel position into an output pixel position using the image height scale and returns the output pixel position to the coordinate system of (v, h). The distortion correction circuit 1 performs the calculation using Expressions (7) and (8) described below.

$$vout = r\_scale*y - [SENSOR\_CROP\_OFS\_V] \tag{7}$$

$$hout = r\_scale*x - [SENSOR\_CROP\_OFS\_H] \tag{8}$$

In Expression (7), vout is an output pixel position (a non-negative number) in the vertical direction. In Expression (8), hout is an output pixel position (a non-negative number) in the horizontal direction.

In other words, according to a series of procedures (a) to (c), the read pixels Pi(vo, ho), Pi1(vo, ho−1), Pi2(vo−1, ho−1), and Pi3(vo−1, ho) are respectively converted into the write pixels Po0(vo', ho'), Po1(vo', ho−1'), Po2(vo−1', ho−1'), and Po3(vo−1', ho').

Note that when the function represented by the polynomial described above is used as the pixel position calculation, it is assumed that the respective parameters [SENSOR_CROP_OFS_V], [SENSOR_CROP_OFS_H], [NORM_SCALE], and Px (x=0 to 10) are set in advance and stored in the parameter storing unit IS.

The pixel position calculation can be performed using grid table conversion as well. A grid table is a two-dimensional address table in which a pixel position (v, h) is a grid node. Conversion destination pixel positions are stored in respective grid nodes. An address corresponding to any pixel position located between the gird nodes is calculated by performing interpolation from near grid nodes. When the grid table conversion is used as the pixel position calculation, the distortion correction circuit 1 performs the pixel position calculation in the following procedure.

(d) Calculation of a reference grid node: The distortion correction circuit 1 determines, as a reference grid node, a grid node located on an upper left of an input pixel. The distortion correction circuit 1 performs the calculation using Expressions (9) and (10) described below.

$$ref\_v = vin*GRID\_PATCH\_VSIZE\_INV \tag{9}$$

$$ref\_h = hin*GRID\_PATCH\_HSIZE\_INV \tag{10}$$

In Expression (9), vin is an input pixel position (a non-negative number) in the vertical direction and GRID_PATCH_VSIZE_INV is an inverse of an inter-vertical grid node distance. The distortion correction circuit 1 calculates GRID_PATCH_VSIZE_INV using the following Expression (11).

$$GRID\_PATCH\_VSIZE\_INV = \frac{1}{([SENSOR\_CROP\_VSIZE] - 1)/([GRID\_NODE\_NUM\_V] - 1)} \tag{11}$$

In Expression (11), [SENSOR_CROP_VSIZE] is an input image vertical size and [GRID_NODE_NUM_V] is the number of vertical grid nodes.

In Expression (10), hin is an input pixel position (a non-negative number) in the horizontal direction and GRID_PATCH_HSIZE_INV is an inverse of an inter-horizontal grid node distance. The distortion correction circuit 1 calculates GRID_PATCH_HSIZE_INV using the following Expression (12).

$$GRID\_PATCH\_HSIZE\_INV = \frac{1}{([SENSOR\_CROP\_HSIZE] - 1)/([GRID\_NODE\_NUM\_H] - 1)} \tag{12}$$

In Expression (12), [SENSOR_CROP_HSIZE] is an input image horizontal size and [GRID_NODE_NUM_H] is the number of horizontal grid nodes.

(e) Calculation of weight: The distortion correction circuit 1 calculates weight based on a ratio of distances in the vertical direction and the horizontal direction from the input pixel position with respect to grid nodes at peripheral four points including the reference grid node. The distortion correction circuit 1 calculates the weight using Expressions (13) and (14) described below.

$$\text{weight\_}v=\text{ref\_}v-[\text{ref\_}v] \quad (13)$$

$$\text{weight\_}h=\text{ref\_}h-[\text{ref\_}h] \quad (14)$$

In Expressions (13) and (14), [ ] represents a Gauss symbol. Weight in the vertical direction concerning the reference grid node is 1−weight_v. Weight in the horizontal direction concerning the reference grid node is 1−weight_h.
(f) Calculation of an output pixel position: The distortion correction circuit 1 calculates an output pixel position according to bilinear interpolation using a table of grid nodes at peripheral four points including the reference grid node and weights of the respective grid nodes with respect to the input pixel position.
(f-1) Calculation of an Output Pixel Position in the Vertical Direction The distortion correction circuit 1 calculates an output pixel position in the vertical direction using Expressions (15) to (17) described below.

$$v0\text{out}=\text{table\_}v(\text{ref\_}v,\text{ref\_}h)*(1-\text{weight\_}h)+\text{table\_}v(\text{ref\_}v,\text{ref\_}h+1)*\text{weight\_}h \quad (15)$$

$$v1\text{out}=\text{table\_}v(\text{ref\_}v+1,\text{ref\_}h)*(1-\text{weight\_}h)+\text{table\_}v(\text{ref\_}v+1,\text{ref\_}h+1)*\text{weight\_}h \quad (16)$$

$$v\text{out}=v0\text{out}*(1-\text{weight\_}v)+v1\text{out}*\text{weight\_}v \quad (17)$$

In Expressions (15) and (16), table_v(v, h) is a vertical pixel position grid table. In Expression (17), vout is an output pixel position (a non-negative number) in the vertical direction.
(f-2) Calculation of an Output Pixel Position in the Horizontal Direction The distortion correction circuit 1 calculates an output pixel position in the horizontal direction using Expressions (18) to (20) described below.

$$h0\text{out}=\text{table\_}h(\text{ref\_}v,\text{ref\_}h)*(1-\text{weight\_}h)+\text{table\_}h(\text{ref\_}v,\text{ref\_}h+1)*\text{weight\_}h \quad (18)$$

$$h1\text{out}=\text{table\_}h(\text{ref\_}v+1,\text{ref\_}h)*(1-\text{weight\_}h)+\text{table\_}h(\text{ref\_}v+1,\text{ref\_}h+1)*\text{weight\_}h \quad (19)$$

$$h\text{out}=h0\text{out}*(1-\text{weight\_}h)+h1\text{out}*\text{weight\_}v \quad (20)$$

In Expressions (18) and (19), table_h(v, h) is a horizontal pixel position grid table. In Expression (20), hout is an output pixel position (a non-negative number) in the horizontal direction.

In other words, according to a series of procedures (d) to (f), the read pixels Pi(vo, ho), Pi1(vo, ho−1), Pi2(vo−1, ho−1), and Pi3(vo−1, ho) are respectively converted into write pixels Po0(vo', ho'), Po1(vo', ho−1'), Po2(vo−1', ho−1'), and Po3(vo−1', ho').

Note that when the grid table conversion explained above is used as the pixel position calculation, it is assumed that the respective parameters of [SENSOR_CROP_VSIZE], [GRID_NODE_NUM_V], [SENSOR_CROP_HSIZE], [GRID_NODE_NUM_H], table_v(v, h), and table_h(v, h) are set in advance and stored in the parameter storing unit 15.

A rectangular region including the pixels Po0(vo', ho'), Po1(vo', ho−1'), Po2(vo−1', ho−1'), and Po3(vo−1', ho') at the four points as vertexes calculated by the pixel position calculation is specified as a write pixel region.

Subsequently, the distortion correction circuit 1 extracts a pixel position (a write pixel candidate Poc(v', h')) where both of a vertical coordinate and a horizontal coordinate are integers in the specified rectangular region. For example, the distortion correction circuit 1 adjusts respective coordinates of the pixels Po0(vo', ho'), Po1(vo', ho−1'), Po2(vo−1', ho−1'), and Po3(vo−1', ho') and converts the coordinates into integers with carry-up or carry-down and sets all pixel positions in a rectangular region circumscribing obtained pixel positions as the writing position candidate Poc(v', h') (step S3).

The distortion correction circuit 1 performs the adjustment and the conversion into integers by the carry-up or carry-down using Expressions (21) and (22) described below. Note that Expression (21) is used for a pixel located on a left side or an upper side among the four points and Expression (22) is used for a pixel located on a right side or a lower side among the four points.

$$\text{Pixel position after adjustment}=[\text{write pixel position}-\text{WRITE\_AREA\_DELTA}] \quad (21)$$

$$\text{Pixel position after adjustment}=[\text{write pixel position}+\text{WRITE\_AREA\_DELTA}] \quad (22)$$

In Expressions (21) and (22), WRITE_AREA_DELTA is a conversion-into-integer and adjustment value and is a value set in advance. [ ] represents a Gauss symbol.

Subsequently, the distortion correction circuit 1 determines whether all the write pixel candidates Poc(v', h') calculated in step S3 are the write pixel Po(v', h'). When there is the write pixel candidate Poc(v', h') not determined yet (step S4, No), the distortion correction circuit 1 calculates a corresponding read pixel Pi(v", h") with the pixel position calculation (step S5). The distortion correction circuit 1 performs the pixel position calculation using an inverse function of the pixel position calculation used in step S2. At this time, a vertical coordinate and a horizontal coordinate of Pi(v", h") are non-integers in general.

Subsequently, the distortion correction circuit 1 specifies pixels necessary for calculating a pixel value of Pi(v", h") with interpolation. For example, when a pixel value is calculated by bilinear interpolation, pixels at four points around Pi(v", h") are the pixels necessary for interpolation. When all the pixels necessary for interpolation are included in the read pixel position set, the distortion correction circuit 1 decides the write pixel candidate Poc(v', h') corresponding to the read pixel Pi(v", h") as the write pixel Po(v', h') (step S6, Yes).

In this case, the distortion correction circuit 1 calculates a pixel value of the decided write pixel Po(v', h') by performing pixel interpolation of a pixel value of the read pixel Pi(v", h") corresponding to the write pixel Po(v', h') and outputs the pixel value of the write pixel Po(v', h') (step S7). Note that the output pixel Po(v', h') is random rather than raster scan order. Subsequently, the distortion correction circuit 1 returns to step S4 and checks presence or absence of the write pixel candidate Poc(v', h') not determined yet.

On the other hand, when a pixel not included in the read pixel position set is present among the pixels necessary for interpolation, the distortion correction circuit 1 decides that the write pixel candidate Poc(v', h') corresponding to the read pixel Pi(v", h") is not the write pixel Po(v', h') (step S6, No). In this case, the distortion correction circuit 1 returns to step S4 without performing the pixel interpolation and checks presence or absence of the write pixel candidate Poc(v' h') not determined yet.

When all the write pixel candidates Poc(v', h') calculated in step S3 are determined in step S4, the distortion correction circuit 1 ends a series of procedures of the image correction processing.

In this way, in the distortion correction processing by the distortion correction circuit 1 in the present embodiment, the correction processing of the input pixels read from the preprocessing circuit 2 in raster scan order is performed in this order. Therefore, a range of input pixels necessary for correction can be suppressed to a degree of one to several lines. Consequently, it is possible to reduce a mounting amount of the line buffer 11 that stores the input pixels. It is possible to suppress manufacturing cost.

Note that the mounting amount of the line buffer 11 is set according to a method of pixel interpolation. For example, when the bilinear method is used, the line buffer 11 only has to be mounted for approximately two lines. However, when a bicubic method is used, the line buffer 11 needs to be mounted for approximately four lines.

A method of the pixel position calculation for calculating a write pixel from a read pixel is not limited to the method explained above. In other words, any method can be used if the method is a method in which an inverse function is present. A plurality of pixel position calculating methods may be used in combination (Multilayering of Output Buffers)

Respective pixels outputted from the distortion correction circuit 1 is inputted to the output buffer circuit 3. After temporarily retaining an input image, the output buffer circuit 3 outputs the image to the DRAM 24 via the bus 23. In this way, a distortion-corrected image is stored in the DRAM 24.

Incidentally, in general, transfer to a DRAM is performed in a predetermined transmission unit considering transmission efficiency. At this time, if the distortion correction processing is performed by the raster scan input/raster scan output, pixels in raster scan order only have to be sequentially accumulated in an output buffer and transferred to the DRAM, for example, every time pixels for one line are accumulated.

In contrast, when the distortion correction processing is performed by the raster scan input/random output, since an output is random, for example, a plurality of transmission unit output buffers are prepared and, every time pixels in raster scan order are accumulated in the respective buffers, the pixels are transferred to the DRAM. In this case, the transfer to the DRAM is performed after all pixels are accumulated in raster scan order in the transmission unit output buffers.

However, in the random output, pixels are not always sequentially written in continuous addresses of the output buffers. Therefore, efficiency of use of the output buffers is deteriorated. When transmission efficiency of the DRAM transfer is considered, a predetermined transmission unit needs to secure a certain degree of size. In contrast, when the efficiency of use of the output buffers in the random output is considered, it is preferable to reduce the predetermined transmission unit.

Therefore, in the present embodiment, by multilayering the output buffers according to a characteristic of lens distortion, both of improvement of the efficiency of use of the output buffers and improvement of the transmission efficiency of the DRAM transfer are achieved and, at the same time, a size reduction of the entire output buffers is performed.

FIG. 5 is block diagram for explaining the output buffer circuit 3 shown in FIG. 1. An example shown in FIG. 5 is an example in which output buffers are multilayered in two stages. However, the output buffers may be multilayered in three or more stages.

In FIG. 5, the output buffer circuit 3 includes a buffer controller 31 and output buffers 32 and 33. The output buffer 32 is an output buffer in a first stage and the output buffer 33 is an output buffer in a second stage. The buffer controller 31 controls writing in and reading from the output buffers 32 and 33.

The output buffer 32 includes a plurality of regions E1 having a predetermined capacity. The output buffer 33 includes a plurality of regions E2 having a predetermined capacity. The capacities of the regions E1 and E2 can be independently set. For example, a sum capacity of the capacity of the regions E1 and the capacity of the region E2 is set to a transmission unit capacity.

For example, if both of the capacities of the regions E1 and E2 are 64 bytes, thirty-two pixels can be stored in each of the respective regions E1 and E2 when one pixel is 16-bit data and sixty-four pixels can be stored in each of the respective regions E1 and E2 when one pixel is 8-bit data.

In the following explanation, sets of series of pixels, corrected pixel positions of which are continuous, respectively stored in the regions E1 or E2 are respectively referred to as sub-blocks. Sets of series of transmission unit pixels, corrected pixel positions of which are continuous, stored in the two regions E1 and E2 are referred to as transmission blocks. Note that when the output buffers are configured in three or more stages, sets of series of transmission unit pixels, corrected pixel positions of which are continuous, stored in the output buffers in the three or more stages are referred to as transmission blocks.

First, the buffer controller 31 stores, in any one of the plurality of regions E1 of the output buffer 32, respective pixels outputted from the distortion correction circuit 1 in random order. At this time, when a target pixel is a corrected pixel position (address) that should be stored in the same region E1 as any one of the regions E1 in which pixels are already stored, the buffer controller 31 stores the target pixel in the region E1. When the target pixel is an address that should be stored in the region E1 different from all of the regions E1 in which pixels are already stored, the buffer controller 31 stores the target pixel in any one of the regions E1 in which pixels are not stored yet.

Tag information (although the camera ID is also included in the tag information in the present embodiment as explained above, the camera ID is explained below) including an address of a specific pixel (for example, a leading pixel in a sub-block) in a sub-block including a pixel to be written first (a sub-block stored in the region E1 in the first stage) is imparted to the respective regions E1 of the output buffer 32.

In this way, the buffer controller 31 writes the pixels, the corrected pixel positions (addresses) of which are continuous, in continuous storage positions of the respective regions E1. In other words, when the capacity of the regions E1 is 64 bytes and one pixel is 16-bit data, pixels for thirty-two pixels, corrected pixel positions (addresses) of which are continuous, are stored in the respective regions E1 For example, when a transmission block, which is a transmission unit, is configured by sixty-four pixels, a sub-block including a half of the pixels of the transmission block can be stored in the region E1.

The buffer controller 31 determines whether pixels are stored in all storage positions of a certain region E1 of the output buffer 32. In the following explanation, all data of the sub-block being stored in the region E1 is referred to as "filling is completed" as well. The buffer controller 31 transfers pixels of a sub-block stored in the region E1 in which filling is completed to the output buffer 33 in a post-stage.

Tag information including an address of a specific pixel (for example, a leading pixel in a sub-block) in a sub-block including a pixel to be written first (a sub-block stored in the region E2 in the second stage) is imparted to the respective regions E2 of the output buffer 33 as well.

The buffer controller 31 writes, in continuous storage positions in the respective regions E2, corrected pixel positions (addresses) of which are continuous. In other words, for example, when the capacity of the regions E2 is 64 bytes and one pixel is 16-bit data, pixels for thirty-two pixels, corrected pixel positions of which are continuous, are stored in the respective regions E2. When one transmission block is configured by sixty-four pixels, pixels of the transmission block are obtained by coupling sub-blocks, addresses of which are continuous, stored in the regions E1 and E2 (an address of an end pixel of one sub-block is continuous to an address of a leading pixel of the other sub-block), to each other.

The buffer controller 31 determines whether filling is completed for each of the regions E2 of the output buffer 33. The buffer controller 31 is configured to, when filling is completed in the region E2, in a state in which all data of the transmission block are stored (in the following explanation, this case is also referred to as "filling is completed") in pixels stored in the region E2 and pixels stored in the region E1 storing pixels, corrected pixel positions of which are continuous to the pixels, transfer all the pixels stored in the regions E1 and E2, that is, a plurality of transmission unit pixels (all pixels of the transmission block), corrected pixel positions of which are continuous, to the DRAM 24 via the bus 23 and cause the pixels to be stored in the DRAM 24.

Figure 6:
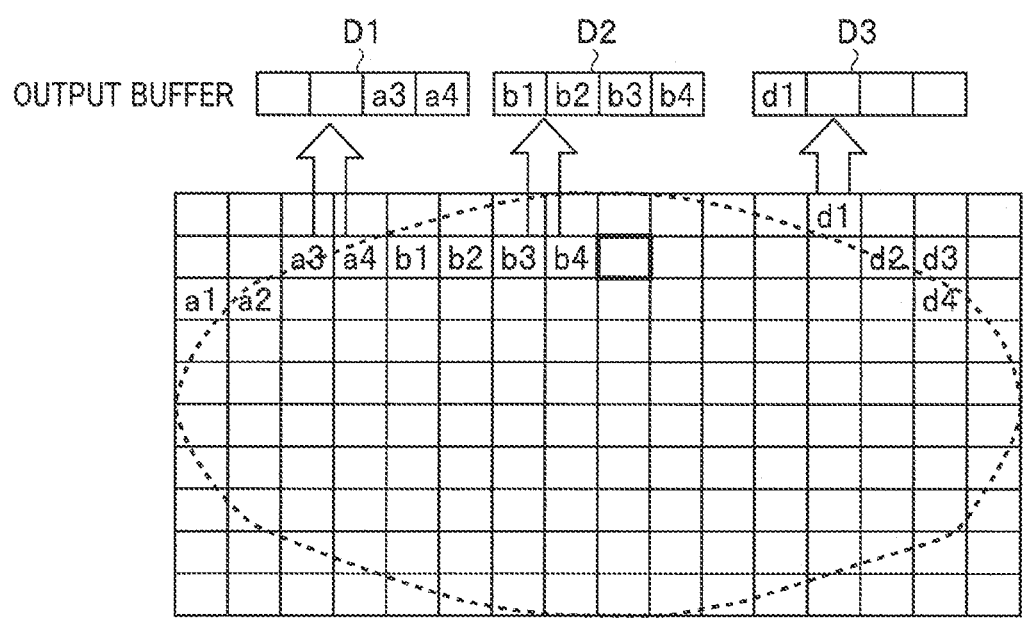
FIG. 6 is a diagram for explaining writing in and reading from a non-multilayered output buffer according to the first embodiment.
Figure 7:
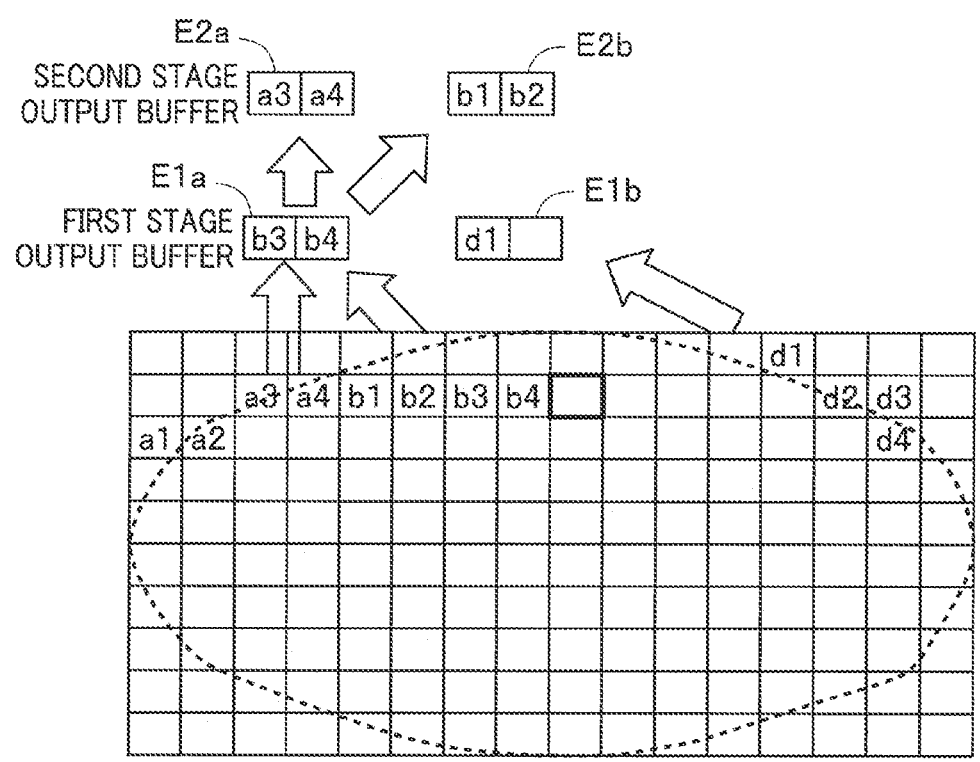
FIG. 7 is a diagram for explaining writing in and reading from multilayered output buffers according to the first embodiment.

Subsequently, a reason why efficiency of use of an output buffer can be improved by the multilayered output buffers 32 and 33 in the present embodiment is explained with reference to FIGS. 6 and 7. FIG. 6 is a diagram for explaining writing in and reading from a non-multilayered output buffer. FIG. 7 is a diagram for explaining writing in and reading from multilayered output buffers.

In order to simplify explanation, it is assumed that an image from the preprocessing circuit 2 includes sixteen pixels in the horizontal direction and a transmission unit to the DRAM 24 is four pixels in FIG. 6 and FIG. 7. FIGS. 6 and 7 show an example in which, as a result of occurrence of barrel-type distortion indicated by a broken line because of an influence of an aberration or the like of the optical system of the image pickup unit 22, respective pixels of a first line of an original image are inputted to the distortion correction circuit 1 as an image in which the pixels move to positions of pixels a1 to a4, b1 to b4, ..., d1 to d4 in FIGS. 6 and 7. The respective pixels from the image pickup unit 22 are inputted to the distortion correction circuit 1 in raster scan order, image processing is performed in order of the inputted pixels, and the pixels are outputted to the output buffers.

FIG. 6 shows an example in which an output buffer is not layered and includes three regions D1 to D3 for four pixels, which are a transmission unit. In the example shown in FIG. 6, among the pixels a1 to a4, b1 to b4, ..., d1 to d4, a pixel to be inputted to the distortion correction circuit 1 first is the pixel d1. The pixel d1 is stored in, for example, the region D3 of the output buffer. When a third pixel a3 from a left of a second line and a pixel a4 are sequentially inputted to the distortion correction circuit 1 and processed, the pixels a3 and a4 after the processing are written in continuous positions of the region D1 (however, an address included in the tag information in the region D1 is, for example, an address of the leading pixel a1). Subsequently, the pixels b1 to b4, corrected pixel positions of which are continuous, are sequentially inputted. The pixels b1 to b4, the corrected pixel positions of which are continuous, are sequentially stored in the region D2. When filling is completed in the region D2, all pixels stored in the region D2 are read and transferred to the DRAM.

In a state in which processing advances to a pixel indicated by a thick frame in FIG. 6, pixels in the region D2 are transferred after the filling is completed and the region D2 changes to an empty state. On the other hand, the region D1 does not change to a filled state until processing of the first and second pixels a1 and a2 from a left of a third line is performed. The region D3 does not change to the filled state until processing of a second pixel d4 from a right of the third line is performed. In other words, although there are empty regions in the output buffer, the empty regions are not used and efficiency of use is low.

FIG. 7 shows an example in which output buffers are multilayered in two stages and shows an example in which a first-stage output buffer is configured by regions E1a and E1b equivalent to the output buffer 32 and a second-stage output buffer is configured by regions E2a and E2b equivalent to the output buffer 33. All of the regions E1a, E1b, E2a, and E2b have a capacity for two pixels.

Among the pixels a1 to a4, b1 to b4, ..., d1 to d4, the pixel d1 to be inputted to the distortion correction circuit 1 first is stored in, for example, the region E1b of the first-stage output buffer. When the third pixel a3 from a left of the second line and the pixel a4 are sequentially inputted to the distortion correction circuit 1 and processed, the pixels a3 and a4 after the processing are written in positions in the region E1a. When filling is completed in the region E1a, the buffer controller 31 transfers the pixels a3 and a4 in sub-blocks stored in the region E1a to, for example, the region E2a of the second-stage output buffer, causes the pixels a3 and a4 to be stored in the region E2a, and changes the region E1a to an empty state.

Subsequently, the pixels b1 to b4, corrected pixel positions of which are continuous, are sequentially inputted. First, the pixels b1 and b2 are written in the region E1a and is further transferred to the region E2b by the buffer controller 31. Further, the buffer controller 31 writes the pixels b3 and b4 in the empty region E1a. When filling is completed in the region E2b configuring the second-stage output buffer and filling is completed in a region of the first-stage output buffer by pixels, corrected pixel positions of which are continuous to pixels stored in the region E2b, the buffer controller 31 transfers pixels in the two regions, that is, all pixels of the transmission blocks stored in the regions E2b and E1a to the DRAM 24 via the bus 23. Consequently, the regions E1a and E2b become empty regions.

In other words, in a state in which processing advances to a pixel indicated by a thick frame in FIG. 7, the first-stage output buffer E1a and the second-stage output buffer E2b are empty regions. Pixels for which the distortion correction processing ends next can be written in the first-stage output buffer E1a and the second-stage output buffer E2b. The processing to the pixel indicated by the thick frame is performed in the total output buffer size (for 4×3=12 pixels) in the example shown in FIG. 6. However, in the example shown in FIG. 7, the processing can be performed in a total output buffer size (for 2×4=8 pixels). Therefore, a configuration example of the buffer circuit shown in FIG. 7 is improved in efficiency of use of the output buffers compared with a configuration example of the buffer circuit shown in FIG. 6.

In the barrel-type distortion shown in FIGS. 6 and 7, distortion is smaller in an image center and is larger at four corners of an image. Accordingly, near the image center, respective pixels are outputted in substantially the same order as input order to the distortion correction circuit 1. Filling speed is relatively high in the respective regions E1 of the first stage buffer, and filling is completed in a relatively short time. Conversely, near the image four corners, input order and output order of the respective pixels to and from the distortion correction circuit 1 are relatively greatly different. Filling speed is relatively low in the respective pixels E1 of the first stage buffer, and a relatively long time is required until filling is completed.

Accordingly, by setting a buffer size of the first stage buffer relatively small, it is possible to improve buffer use efficiency by a pixel in a pixel position where filling speed is high and suppress deterioration in buffer use efficiency by a pixel in a pixel position where filling speed is low. Consequently, it is possible to reduce a total buffer size and improve transmission efficiency. Note that, in a configuration in which (the number of regions E1 of the first-stage output buffer 32)≥(the number of regions E2 of the second-stage output buffer 33), the transmission efficiency can be further improved. The configuration is also sometimes suitable when output buffers are layered in three or more stages.

(An Example of Evaluation)

When a predetermined fisheye lens was adopted as an optical system of one of the image pickup units 22a and 22b, about a capacity of an output buffer necessary for performing distortion correction for images from the image pickup unit 22a or 22b in which the fisheye lens was adopted, evaluation for comparing a one-stage configuration and a two-stage configuration of the output buffer was performed.

Simulation was performed about a case in which a transmission block size, which was a transmission unit to the DRAM 24 via the bus 23, was set to 128 bytes. Output buffer capacities necessary for the distortion correction were calculated about the output buffer of the one-stage configuration shown in FIG. 6 and the output buffers of the two-stage configuration shown in FIG. 7. Note that it is assumed that one pixel is 16-bit data and one transmission block is a set of sixty-four pixels.

According to the simulation, when the output buffer is configured in one stage, for the distortion correction, it is necessary to use an output buffer including 1001 regions (hereinafter referred to as entries as well) that store the one transmission block (128 bytes). In other words, an output buffer size in this case is 1001×128 bytes=125 K bytes.

In contrast, when the output buffers are configured in two stages, for the distortion correction, the output buffer 32 including 447 regions (entries) E1 that store one sub-block (64 bytes) and the output buffer 33 including 232 regions (entries) E2 that store one sub-block (64 bytes) only have to be used. An output buffer size in this case is 447×64 bytes+232×64 bytes=42 K bytes.

In other words, in this example, it is possible to reduce a total size of the output buffers to approximately ⅓ by multilayering the output buffers. Note that, if the total size of the output buffers is not changed, it is possible to increase a transmission block size by multilayering the output buffers. It is possible to further improve transmission efficiency.

In this way, it is possible to reduce the buffer memory capacity and improve the transmission efficiency by multilayering the output buffers in a plurality of stages and setting the numbers of buffers (the numbers of entries) and buffer sizes in the respective stages to proper values making use of characteristics that magnitude of distortion is different depending on a position of an image and filling speeds of the output buffers are different.

(Difference Between Output Buffer Use Amounts by the Image Pickup Units 22a and 22b)

Figure 8:
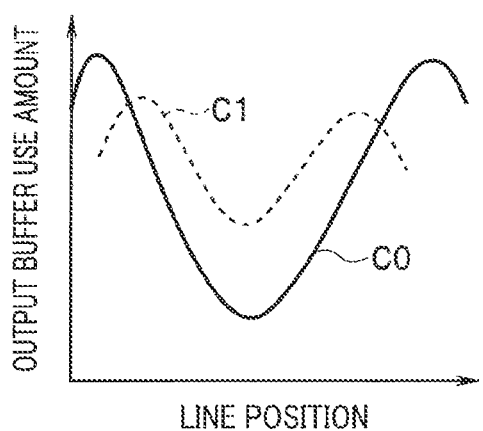
FIG. 8 is a graph showing an example of a change in an amount of use of the output buffers corresponding to an image pickup unit according to the first embodiment.

FIG. 8 is a graph showing an example of changes in use amounts of the output buffers corresponding to the image pickup units 22a and 22b.

As explained above, in the case of the barrel-type distortion, distortion is larger in a peripheral part of an image. Accordingly, a use amount of the output buffers is larger than in a center of the image. Therefore, the use amount of the output buffers is relatively large near a first line and a last line of the image and is relatively small near a center line of the image.

At this time, when types (for example, angles of view of lenses and the numbers of pixels of image pickup devices) of the image pickup unit[0] 22a and the image pickup unit[1] 22b are different, as shown in FIG. 8, a line position of a user amount peak of the output buffers is sometimes different for each of the image pickup units 22a and 22b.

In the example shown in FIG. 8, a curved line C0 indicates an example of a change in an output buffer use amount of the image pickup unit[0] 22a with respect to the line position and a curved line C1 indicates an example of a change in an output buffer use amount of the image pickup unit[1] 22b with respect to the line position.

In the example shown in FIG. 8, the number of output lines of the image pickup unit[0] 22a is larger than the number of output lines of the image pickup unit[1] 22b. A maximum value of an output buffer use amount of the image pickup unit[0] 22a is larger than a maximum value of an output buffer use amount of the image pickup unit[1] 22b. A minimum value of the output buffer use amount of the image pickup unit[0] 22a is smaller than a minimum value of the output buffer use amount of the image pickup unit[1] 22b.

If the output buffer circuits 3 are separately provided for the image pickup unit[0] 22a and the image pickup unit[1] 22b, as a total buffer capacity, it is necessary to secure a capacity equal to or larger than an added maximum value obtained by totaling the maximum value of the output buffer use amount of the image pickup unit[0] 22a and the maximum value of the output buffer use amount of the image pickup unit[1] 22b.

In contrast, when the output buffer circuit 3 is configured to be shared by the image pickup unit[0] 22a and the image pickup unit[1] 22b, a buffer capacity covering a peak position (a combined maximum value) of a combined curved line obtained by adding up the curved line C0 and the curved line C1 is enough. When types of image pickup units are different, in general, the combined maximum value is smaller than the added maximum value.

Because of such a reason, in order to improve the efficiency of use of the output buffers and reduce the capacity of the output buffers, in the present embodiment, a configuration is adopted in which the output buffer circuit 3 is shared by the image pickup unit[0] 22a and the image pickup unit[1] 22b. Accordingly, camera IDs for distinguishing the image pickup unit[0] 22a and the image pickup unit[1] 22b are added to the tag information.

Figure 9:
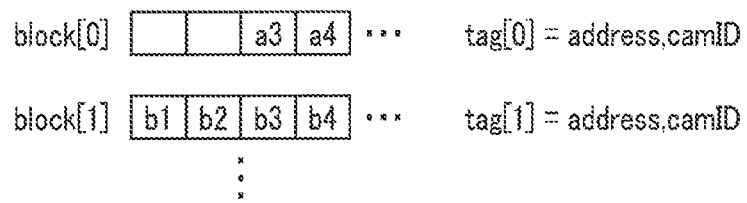
FIG. 9 is a diagram showing an example of tag information added to sub-blocks in the output buffers according to the first embodiment.

FIG. 9 is a diagram showing an example of tag information added to sub-blocks in an output buffer.

As explained above, the buffer controller 31 adds, to sub-blocks (block[0], block[1], . . . ) stored in the output buffers E1 and E1, tag information (tag[0], tag[1], . . . )

including addresses of specific pixels (for example, leading pixels in the sub-blocks) and camera IDs (camIDs) for identifying the image pickup units 22a and 22b, which generate images including transmission blocks.

At this time, when a sub-block of the output buffer E1 and a sub-block of the output buffer E2, a camera ID of which is common and addresses of which are continuous, are coupled to generate a transmission block, tag information including an address of a specific pixel included in the generated transmission block (for example, a leading pixel in the transmission block) and the common camera ID is added to the transmission block.

When the output buffer circuit 3 is configured by a plurality of stages equal to or more than three stages as well, when a plurality of sub-blocks, a camera ID of which is common and addresses of which are continuous, are coupled and stored in an output buffer in a post-stage, tag information including an address of a specific pixel included in a sub-block generated by the coupling (for example, a leading pixel in the sub-block) and the common camera ID is added to the sub-block.

By including the camera ID in the tag information in addition to the address, it is possible to distinguish pixels from the image pickup unit[0] 22a and pixels from the image pickup unit[1] 22b and accumulate the pixels in one output buffer circuit 3.

As explained above, the output buffer circuit 3 is configured to have the buffer capacity covering the peak position (the combined maximum value) of the combined curved line obtained by adding up the curved line C0 and the curved line C1 explained with reference to FIG. 8. However, since an increase in a margin for the combined maximum value leads to an increase in the buffer capacity, it is preferable to set the margin as small as possible.

During actual use, fluctuation due to various factors is present in output timing of pixels outputted from the image pickup unit[0] 22a and output timing of pixels outputted from the image pickup unit[1] 22b. Then, it is likely that a peak value higher than a combined maximum value of a combined curved line estimated during design appears and the output buffer overflows.

Therefore, in the image processing apparatus 21 in the present embodiment, an overflow of the output buffer is predicted beforehand and, when the overflow is predicted, pixels are temporarily retained in the FIFO 5, which is the input buffer circuit, to avoid the overflow. Processing for avoiding the overflow is explained with reference to FIG. 10.

Figure 10:
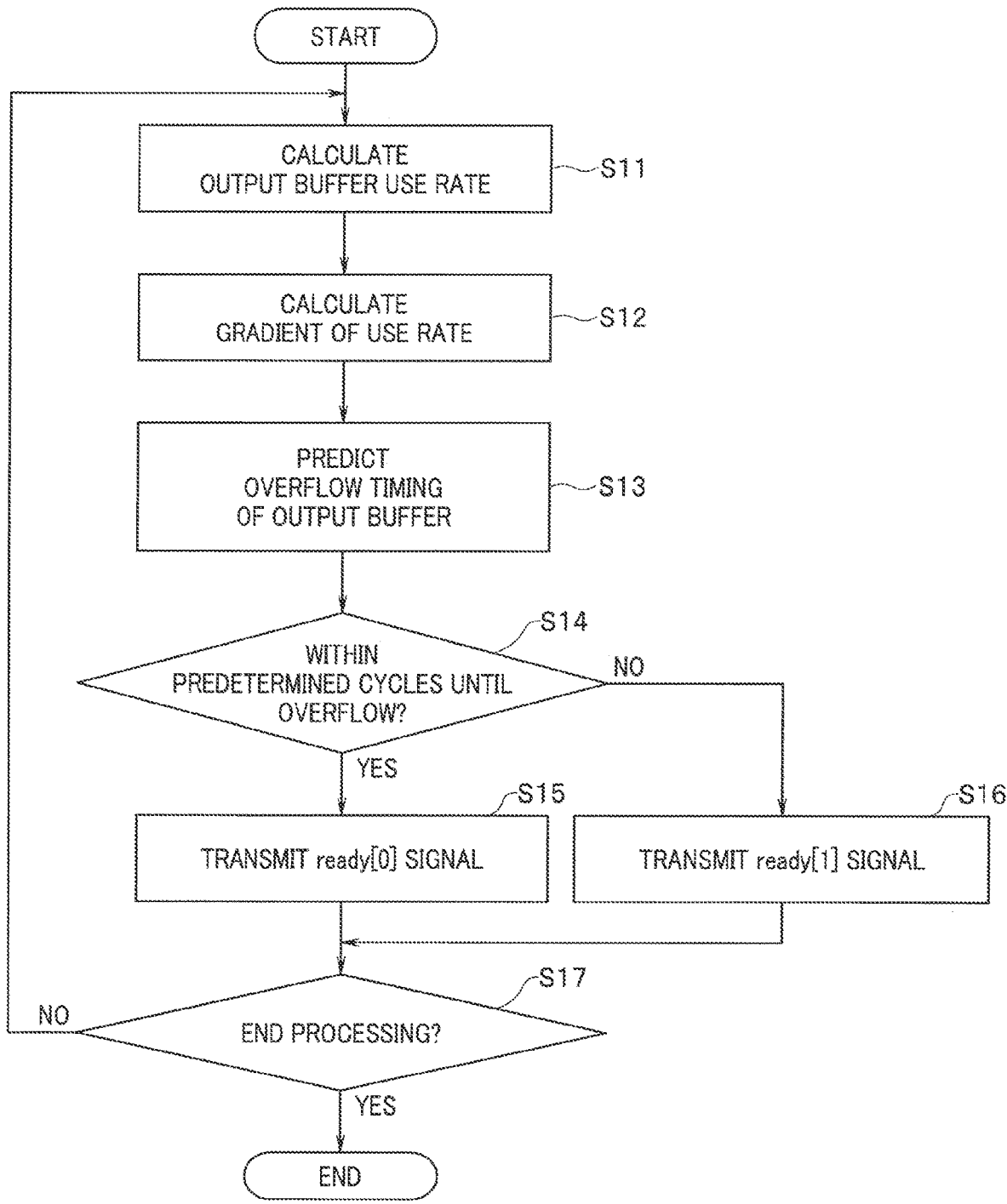
FIG. 10 is a flowchart showing processing that a buffer controller performs by monitoring an overflow according to the first embodiment.

FIG. 10 is a flowchart showing processing performed by the buffer controller 31 to monitor an overflow.

The buffer controller 31 calculates, at every one operation cycle (or every predetermined number of operation cycles), a rate of use of the output buffers provided in the output buffer circuit 3 (step S11).

Subsequently, the buffer controller 31 calculates a gradient of a buffer use rate from a buffer use rate calculated last time and a buffer use rate calculated this time (and, according to necessity, a buffer use rate calculated before the last time) (step S12). Note that although the gradient is calculated assuming that a change in the buffer use rate is precited by first-order approximation, the gradient may be predicted by approximation of second or higher order.

Subsequently, when the gradient of the buffer use rate is positive (that is, indicates that the buffer use rate is increasing), the buffer controller 31 predicts after how many operation cycles the buffer use rate reaches 100% or more (that is, the output buffer overflows) if a present buffer use rate increases at the calculated gradient (step S13).

The buffer controller 31 determines whether the number of operation cycles until the overflow is equal to or smaller than a preset predetermined cycle (step S14).

When determining in step S14 that the number of operation cycles is equal to or smaller than the predetermined cycle, the buffer controller 31 transmits a standby signal (a ready[0] signal) (an instruction signal) to the input controller 4 (step S15). As explained above, when receiving the standby signal (the ready[0] signal) (the instruction signal), the input controller 4 temporarily accumulates pixels inputted from the image pickup unit 22 in the FIFO 5 without transferring the pixels to the preprocessing circuit 2.

In this way, the buffer controller 31 monitors a rate of use of the output buffer circuit 3 and, when an overflow of the output buffer circuit 3 is predicted, outputs an instruction signal to the input controller 4. According to the instruction signal, the input controller 4 causes the FIFO 5, which is the input buffer circuit, to buffer inputs from the plurality of image pickup units 22a and 22b and controls the FIFO 5 to output the inputs to the image processing circuits (the preprocessing circuit 2 and the distortion correction circuit 1) with a delay.

When determining in step S14 that the number of operation cycles is not equal to or smaller than the predetermined cycle, the buffer controller 31 transmits a preparation completion signal (a ready[1] signal) to the input controller 4 (step S16). When receiving the preparation completion signal (the ready[1] signal), when pixels are accumulated in the FIFO 5, the input controller 4 accumulates pixels inputted from the image pickup unit 22 in the FIFO 5 and, at the same time, outputs the pixels from the FIFO 5 to the preprocessing circuit 2. When receiving the preparation completion signal (the ready[1] signal), when pixels are not accumulated in the FIFO 5, the input controller 4 transfers pixels inputted from the image pickup unit 22 to the preprocessing circuit 2.

After performing the processing in step S15 or step S16, the buffer controller 31 determines whether all of processing are completed for both of the images from the image pickup unit[0] 22a and the images from the image pickup unit[1] 22b and whether to end the processing (step S17).

When determining in step S17 not to end the processing, the buffer controller 31 returns to step S11 and performs processing of a next operation cycle as explained above. On the other hand, when determining in step S17 to end the processing, the buffer controller 31 ends the processing.

Figure 11:
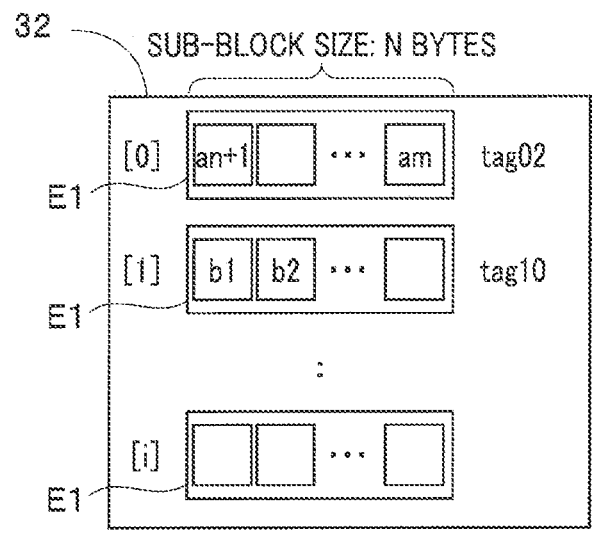
FIG. 11 is an explanatory diagram for explaining operation of an output buffer in a certain stage in FIG. 1 according to the first embodiment.
Figure 12:
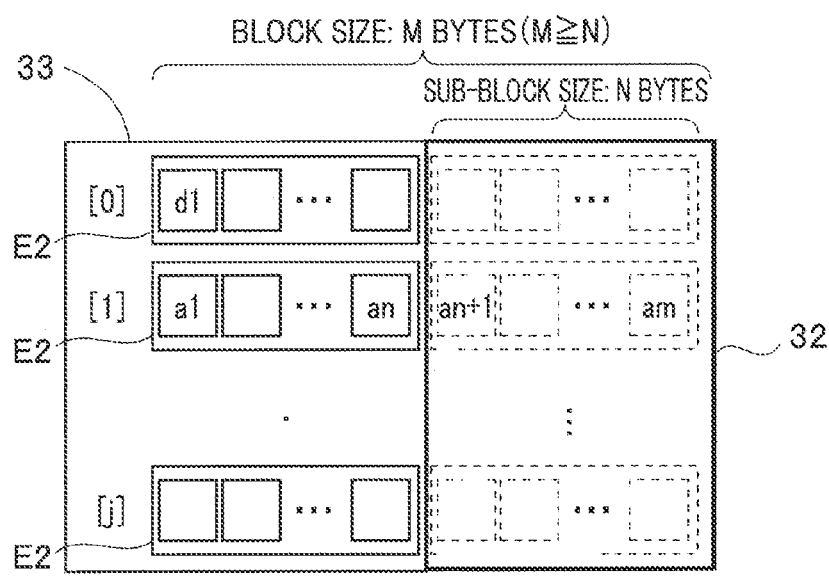
FIG. 12 is an explanatory diagram for explaining operation of an output buffer in a next stage in FIG. 1 according to the first embodiment.

Operation of the output buffer circuit 3 is explained in further detail with reference to FIGS. 11 and 12. FIG. 11 is an explanatory diagram for explaining operation of an output buffer in a certain stage (in an example of a two-stage configuration, a first stage) in FIG. 1. FIG. 12 is an explanatory diagram for explaining operation of an output buffer in a next stage (in the example of the two-stage configuration, a second stage) in FIG. 1.

FIG. 11 shows the output buffer 32. The output buffer 32 includes a plurality of (more specifically, (i+1)) regions E1 indicated by [0], [1], . . . , [i] (hereinafter, when it is necessary to distinguish the regions, the regions are referred to as regions E1[0]. E1[1], . . . , E1[$i$]). Each of the plurality of regions E1[0], E1[1], . . . , E1[$i$] stores pixels of a sub-block and has a capacity of N bytes. One or more pixels are stored in each region E1, whereby, as explained above, tag information (a tag) including, for example, an address of a leading pixel in a sub-block stored in the region E1 and a camera ID (camID) is added to the region E1.

Series of pixels (pixels of the sub-block), corrected pixel positions (addresses) of which are continuous, outputted from the same image pickup units 22a and 22b are stored in the respective regions E1 and E2. Accordingly, it is unnecessary to include addresses of the respective pixels in the sub-block in the tag information. If one address of a specific pixel (for example, a leading pixel in the sub-block) is included in the tag information, it is possible to specify the addresses of the respective pixels in the sub-block.

FIG. 12 shows the output buffer 33. The output buffer 33 includes a plurality of (more specifically, (j+1)) regions E2 indicated by [0], [1], . . . , [j] (hereinafter, when it is necessary to distinguish the regions, the regions are referred to as regions E2[0], E2[1], . . . , E2[j]). Each of the plurality of regions E2[0], E2[1], . . . , E2[j] stores pixels of a sub-block and has a capacity of N bytes. One or more pixels are transferred to each region E2 from the output buffer 32, whereby, as explained above, tag information (a tag) including, for example, an address of a leading pixel in a sub-block stored in the region E2 and a camera ID (camID) is added to the region E2.

The buffer controller 31 manages, with the tag information, transfer of pixels from the output buffer 32 to the output buffer 33. Consequently, the buffer controller 31 can couple two sub-blocks, camera IDs of which coincide and addresses of which are continuous, stored in the regions E1 and E2 to generate a larger sub-block or generate a transmission block.

More specifically, in the two sub-blocks to be coupled, an address of an end pixel of one sub-block and an address of a leading pixel of the other sub-block are continuous. At this time, an address of a new sub-block (or transmission block) generated by the coupling is an address of a leading pixel of the one sub-block.

For example, it is assumed that, among a series of pixels a1, a2, . . . , an, an+1, . . . , am, corrected pixel positions of which are continuous, configuring the transmission block, first, the pixels a1, a2, . . . , an are stored in a predetermined region E1 of the output buffer 32. In this case, tag information tag01 including an address corresponding to, for example, a leading pixel a1 of the pixels a1, a2, . . . , an and a camera ID is added to and stored in the region E1.

When filling is completed in the region E1, the buffer controller 31 transfers the pixels a1, a2, . . . , an of the sub-block to the region E2, for example, the region E2[1] of the output buffer 33 together with the tag information tag01, and causes the pixels to be stored in the region E2[1] (see FIG. 12).

It is assumed that, subsequently, pixels an+1, . . . , am, addresses of which are continuous to the pixels a1, a2, . . . , an, are written in the region E1, for example, the region E1[0] of the output buffer 32 (see FIG. 11). In this case, tag information tag02 (for example, tag information tag02 including an address corresponding to a leading pixel an+1 and a camera ID) indicating that an image position is continuous to the tag information tag01 of the region E2[1] is added to and stored in the region E1[0].

When filling is completed in the region E1[0] by the pixels an+1, . . . , am, the buffer controller 31 reads, using the tag information, pixels of a transmission block (since the example of the two-stage configuration is explained here, the transmission block is generated by coupling two sub-blocks) stored in the region E2[1] of the output buffer 33 and the region E1[0] of the output buffer 32, that is, the series of pixels a1, a2, . . . , an, an+1, . . . , am, camera IDs of which coincides and addresses of which are continuous, and transfer the pixels to the DRAM 24 via the bus 23.

In this case, the buffer controller 31 adds, to the transmission block, tag information (for example, tag information including an address corresponding to the leading pixel a1 and a camera ID common to tag01 and tag02) tag[0] including an address corresponding to a pixel position of a specific pixel (for example, a leading pixel) included in the pixels a1, a2, . . . , an, an+1, . . . , am and a camera ID.

The CPU 25 refers to the tag information tag[0] and causes the transmission block to be stored in a position corresponding to the address in the memory[0] 24a or the memory[1] 24b of the DRAM 24 corresponding to the camera ID.

Note that FIGS. 11 and 12 show examples in which both sizes (capacities) of sub-blocks stored in the regions E1 and E2 are N bytes (n pixels). A transmission block size is M=2N and m=2n. However, it is also possible to transfer pixels of a transmission block configured by a sub-block of N bytes (n pixels) stored in the region E2 and a sub-block smaller than N bytes stored in the region E1. In this case, M≥N.

In the explanation referring to FIGS. 11 and 12, the tag information added according to the transferred sub-block is stored in the output buffer 33 in the second stage. However, when a positional relation on an image between a sub-block stored in the output buffer 33 and a sub-block stored in the output buffer 32 in the first stage corresponding to the sub-block is clear, tag information indicating an image position corresponding to the transmission block may be stored in the output buffer 33.

(Implementation Example)

Figure 13:
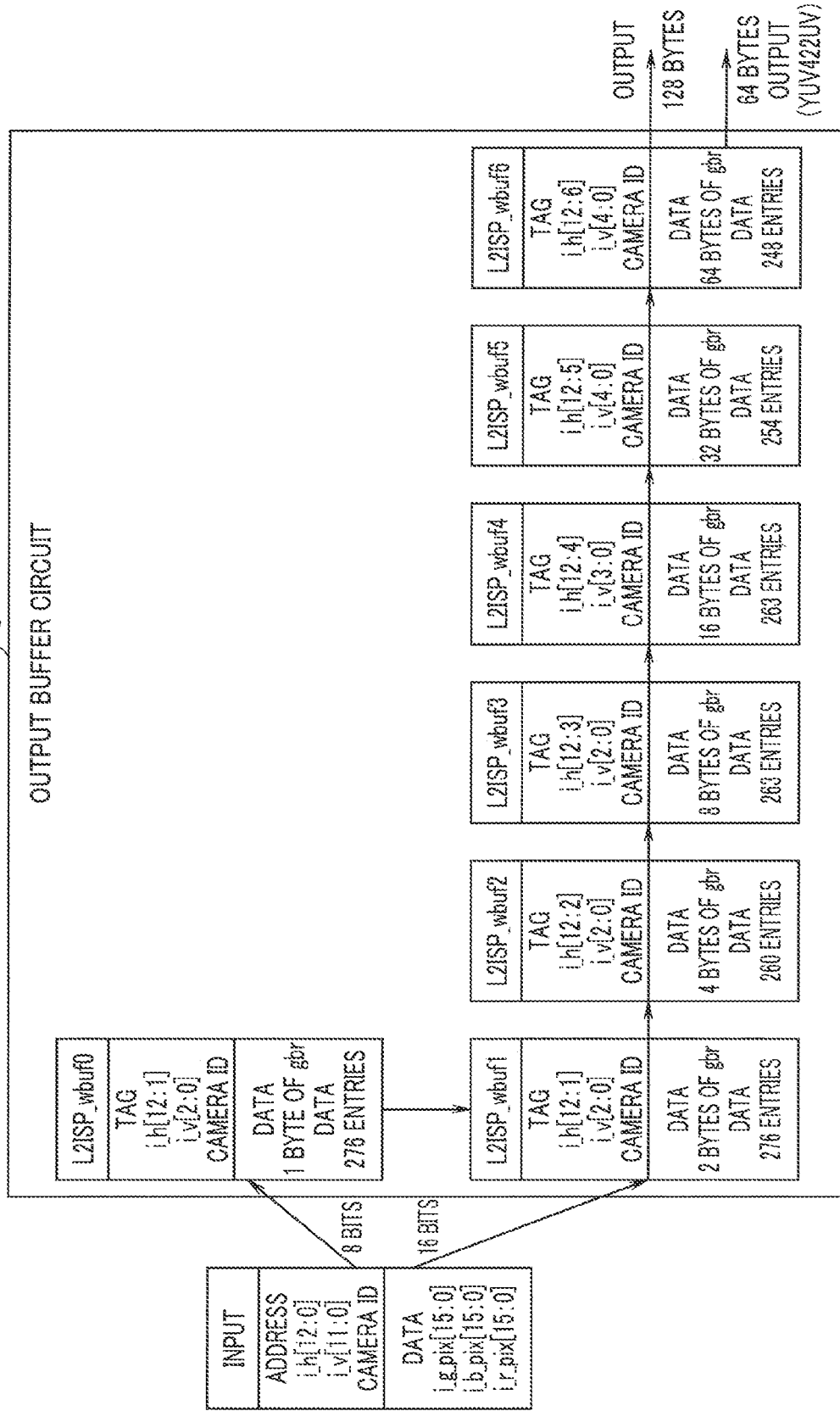
FIG. 13 is a diagram for explaining an implementation example of the output buffer circuit according to the first embodiment.

FIG. 13 is a diagram for explaining an implementation example of the output buffer circuit 3. Note that, in FIG. 13, notation [y:x] indicates data in a bit range from an x-th bit on a low order side to a y-th bit on a high order side. The numbers of entries in respective stages shown in FIG. 13 are examples. The numbers of entries are not limited to the numbers shown in FIG. 13 and only have to be set to appropriate numbers that are necessary according to distortion aberration, chromatic aberration of magnification, and the like. Write and read control shown in FIG. 13 is realized by the buffer controller 31 shown in FIG. 5.

An input pixel to the output buffer circuit 3 is respective 16-bit data including G, B, and R components i_g_pix[15:0], i_b_pix[15:0], and i_r_pix[15:0]. The input pixel includes a 13-bit horizontal address i_h[12:0] indicating a corrected pixel position in the horizontal direction and a 12-bit vertical address i_v[11:0] indicating a corrected pixel position in the vertical direction and a camera ID.

In the example shown in FIG. 13, a first-stage buffer L2ISP_wbuf1 to a sixth-stage buffer L2ISP_wbuf6 are provided in the output buffer circuit 3.

In the first-stage buffer L2ISP_wbuf1, 2-byte data of G, B, and R components (for one pixel) is stored for 276 entries. More specifically, 2-byte data of the G component, 2-byte data of the B component, and 2-byte data of the R component are stored in one entry as pixel values. In a tag of the first-stage buffer L2ISP_wbuf1, a 12-bit horizontal address i_h[12:1] and a 3-bit vertical address i_v[2:0] and a camera ID are stored. When filling of sub-blocks is completed in the entries of the first-stage buffer L2ISP_wbuf1, the data is transferred from the first-stage buffer L2ISP_wbuf1 to the second-stage buffer L2ISP_wbuf2.

In the second-stage buffer L2ISP_wbuf2, 4-byte data of G, B, R components (for two pixels) are stored for 260 entries. In a tag of the second-stage buffer L2ISP_wbuf2, an 11-bit horizontal address i_h[12:2] and a 3-bit vertical address i_v[2:0] and a camera ID are stored. In the second-stage buffer L2ISP_wbuf2, the data transferred from the first-stage buffer L2ISP_wbuf1 is stored in entries, camera IDs of which coincide and addresses of which are continuous. When filling of sub-blocks are completed in the entries of the second-stage buffer L2ISP_wbuf2, the data is transferred from the second-stage buffer L2ISP_wbuf2 to the third-stage buffer L2ISP_wbuf3.

In the third-stage buffer L2ISP_wbuf3, 8-byte data of G, B, and R components (for four pixels) is stored for 263 entries. In a tag of the third-stage buffer L2ISP_wbuf3, a 10-bit horizontal address i_h[12:3] and a 3-bit vertical address i_v[2:0] and a camera ID are stored. In the third-stage buffer L2ISP_wbuf3, the data transferred from the second-stage buffer L2ISP_wbuf2 is stored in entries, camera IDs of which coincide and addresses of which are continuous. When filling of sub-blocks is completed in the entries of the third-stage buffer L2ISP_wbuf3, the data is transferred from the third-stage buffer L2ISP_wbuf3 to the fourth-stage buffer L2ISP_wbuf4.

In the fourth-stage buffer L2ISP_wbuf4, 16-byte data of G, B, and R components (for eight pixels) is stored for 263 entries. In a tag of the fourth-stage buffer L2ISP_wbuf4, a 9-bit horizontal address i_h[12:4] and a 4-bit vertical address i_v[3:0] and a camera ID are stored. In the fourth-stage buffer L2ISP_wbuf4, the data transferred from the third-stage buffer L2ISP_wbuf3 is stored in entries, camera IDs of which coincide and addresses of which are continuous. When filling of sub-blocks is completed in the entries of the fourth-stage buffer L2ISP_wbuf4, the data is transferred from the fourth-stage buffer L2ISP_wbuf4 to the fifth-stage buffer L2ISP_wbuf5.

In the fifth-stage buffer L2ISP_wbuf5, 32-byte data of G, B, and R components (for sixteen pixels) is stored for 254 entries. In a tag of the fifth-stage buffer L2ISP_wbuf5, an 8-bit horizontal address i_h[12:5] and a 5-bit vertical address i_v[4:0] and a camera ID are stored. In the fifth-stage buffer L2ISP_wbuf5, the data transferred from the fourth-stage buffer L2ISP_wbuf4 is stored in entries, camera IDs of which coincide and addresses of which are continuous. When filling of sub-blocks is completed in the entries of the fifth-stage buffer L2ISP_wbuf5, the data is transferred from the fifth-stage buffer L2ISP_wbuf5 to the sixth-stage buffer L2ISP_wbuf6.

In the sixth-stage buffer L2ISP_wbuf6, 64-byte data of G, B, and R components (for thirty-two pixels) is stored for 248 entries. In a tag of the sixth-stage buffer L2ISP_wbuf6, a 7-bit horizontal address i_h[12:6] and a 5-bit vertical address i_v[4:0] and a camera ID are stored. In the sixth-stage buffer L2ISP_wbuf6, the data transferred from the fifth-stage buffer L2ISP_wbuf5 is stored in entries, camera IDs of which coincide and addresses of which are continuous.

As explained above, the number of pixels, addresses of which are continuous, increases as the storage shifts from the first stage to the sixth stage. Therefore, it is unnecessary to store bits in the tags in order from low-order bits of the horizontal addresses. It is sufficient to store only high-order bits. Distortion increases as the number of pixels, addresses of which are continuous, increases. Therefore, the numbers of bits of the vertical addresses are increased as appropriate as the storage shifts from the first stage to the sixth stage.

When 128-byte data, addresses of which are continuous, are present in the entries of the respective stages in which filling is completed, the data in the entries of the respective stages are coupled. For example, when two 64-byte data, addresses of which are continuous, are present in two entries in the sixth stage in which filling is completed, the buffer controller 31 couples the data to generate 128-byte data, addresses of which are continuous. For example, when there is one 64-byte data in one entry, in which filling is completed, in the sixth stage, there are two 32-byte data in two entries, in which filling is completed, in the fifth stage, and addresses of the data are continuous, the buffer controller 31 couples the one 64-byte data and the two 32-byte data to generate 128-byte data, addresses of which are continuous.

The buffer controller 31 adds tag information including an address and a camera ID to the 128-byte data, addresses of which are continuous, generated in this way to generate a transmission block. The generated transmission block is transmitted from the output buffer circuit 3 to the DRAM 24 through the bus 23. As explained above, the transmission block is stored in a position corresponding to an address indicated by the tag information in the memory[0] 24a or the memory[1] 24b of the DRAM 24 corresponding to the camera ID indicated in the tag information.

Note that the example in which one pixel is 16-bit data is explained above with reference to FIG. 13. However, when one pixel is 8-bit data, as shown in an upper stage in the output buffer circuit 3 shown in FIG. 13, a zero-th stage buffer L2ISP_wbuf0 only has to be added to store 1-byte data of G, B, and R components (for one pixel) for 276 entries. More specifically, 1-byte data of the G component, 1-byte data of the B component, and 1-byte data of the R component are stored in one entry as pixel values. In a tag of the zero-th stage buffer L2ISP_wbuf0, a 12-bit horizontal address i_h [12:1] and a 3-bit vertical address i_v [2:0] and a camera ID are stored.

When filling of sub-blocks is completed in the entry of the zero-th stage buffer L2ISP_wbuf0, the data is transferred from the zero-th stage buffer L2ISP_wbuf0 to the first-stage buffer L2ISP_wbuf1. Data for two pixels, addresses of which are continuous, is stored in one entry of the first-stage buffer L2ISP_wbuf1. When one pixel is 8-bit data, the number of pixels stored in one entry in each stage after the first stage is a double of the number of pixels in the case of the 16-bit data.

When a YUV422 planar format is adopted, an output data width of UV pixels (br) is a half of an output data width of a Y pixel (g). Therefore, the Y pixel is outputted in a 128-byte transmission block. However, each of the UV pixels is outputted in a 64-byte transmission block.

In this way, the output buffer circuit 3 includes a plurality of output buffers layered in two or more stages. The output buffer circuit 3 sequentially performs, after all pixels in sub-blocks stored in the output buffer in a certain stage are collected, transferring the pixels to the output buffer in a next stage and couples a plurality of blocks, in which all pixels of the output buffers in one or more stages including the output buffer in a last stage are collected, to generate a transmission block. The buffer controller 31 adds tag information including an address of a specific pixel included in the transmission block and a camera ID to the transmission block and causes the output buffer circuit 3 to output the transmission block.

According to the first embodiment explained above, the input controller 4 switches, line by line, an image to be inputted and inputs, line by line, a plurality of images generated by the plurality of image pickup units 22a and 22b and performs image processing in the image processing circuits (the preprocessing circuit 2 and the distortion correction circuit 1) with the pipeline processing. Therefore, it is unnecessary to provide image processing circuits as many as the image pickup units. It is possible to reduce a circuit size and achieve a reduction in power consumption and cost.

Further, tag information including an address and a camera ID is added to a block stored by the output buffer circuit 3. Therefore, the output buffer circuit 3 is capable of buffering the plurality of images generated by the plurality of image pickup units 22a and 22b. Consequently, it is possible to improve efficiency of use of the output buffer circuit 3. It is unnecessary to provide the output buffer circuits 3 as many as the image pickup units. It is possible to reduce a circuit size and achieve a reduction in power consumption and cost.

The output buffer circuit 3 outputs pixels of an image for each transmission block, which is a set of pixels, pixel positions of which are continuous, in one image. Therefore, it is possible to improve transmission efficiency compared with when the pixels are outputted in a smaller block unit (for example, for each one pixel).

Tag information including an address and a camera ID is added to the transmission block. Therefore, it is possible to cause the transmission block to be stored in the DRAM 24 in an appropriate address of an appropriate storage region for each image in the DRAM 24.

When a rate of use of the output buffer circuit 3 is monitored and an overflow is predicted, inputs from the plurality of image pickup units 22a and 22b are buffered in the FIFO 5, which is the input buffer circuit. Therefore, even when there is fluctuation in timings of the inputs from the plurality of image pickup units 22a and 22b, it is possible to process the images with the image processing circuits (the preprocessing circuit 2 and the distortion correction circuit 1) without causing processing omission.

The image processing circuits include the distortion correction circuit 1 that corrects distortion of a plurality of images. Therefore, the image processing circuits are also suitable for a cost reduction of, for example, a vehicle-mounted camera including a plurality of image pickup units in which a wide angle lens is adopted.

The FIFO 5, which is the input buffer circuit, is provided further on the pre-stage side than the preprocessing circuit 2 that performs the demosaic processing on RAW images inputted from the plurality of image pickup units 22a and 22b to generate an RGB image. Therefore, in general, the FIFO 5 only has to buffer a RAW image having a data amount smaller than a data amount of an RGB image. Therefore, it is possible to further reduce a buffer capacity than when the FIFO 5 is provided further on the post-stage side than the preprocessing circuit 2.

Since the output buffer circuit 3 is layered in two or more stages, it is possible to reduce a total buffer size and improve transmission efficiency. At this time, since tag information including addresses and camera IDs is added to sub-blocks in the respective stages, it is possible to appropriately distinguish and store, in all the stages, images from the plurality of image pickup units 22.

Second Embodiment

Figure 14:
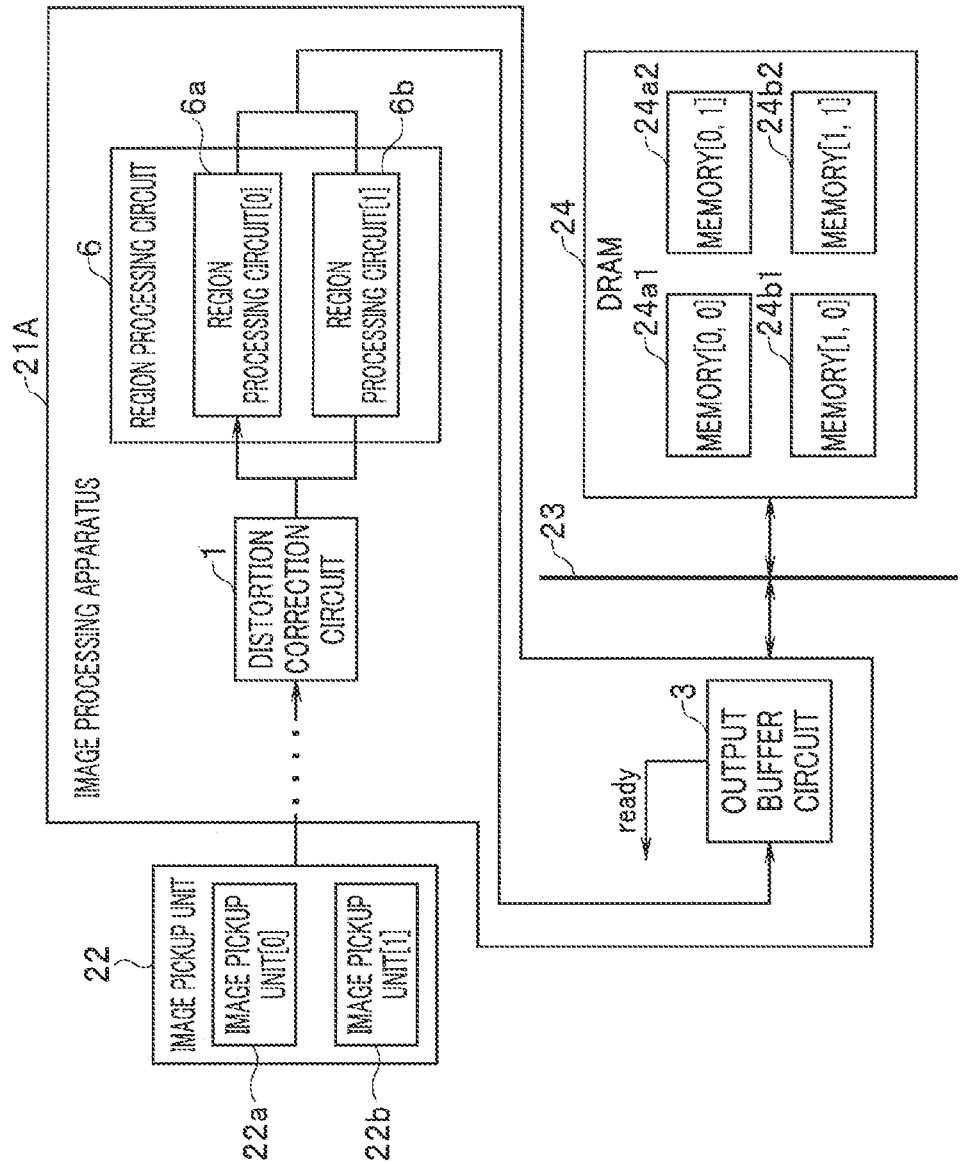
FIG. 14 is a block diagram showing a configuration of an image processing system according to a second embodiment with a part of the configuration omitted.

FIG. 14 is a block diagram showing a configuration of an image processing system according to a second embodiment with a part of the configuration omitted.

In the second embodiment, the same portions as the portions in the first embodiment explained above are, for example, denoted by the same reference numerals and signs to omit explanation as appropriate. Differences from the first embodiment are mainly explained.

Note that although illustration is omitted for simplification in FIG. 14, like the image processing system shown in FIG. 1, the image processing system includes the CPU 25.

Like the image processing apparatus 21 shown in FIG. 1, an image processing apparatus 21A in the second embodiment includes the input controller 4, the FIFO 5, and the preprocessing circuit 2. As explained with reference to FIG. 10, as in the first embodiment, when predicting an overflow within a predetermined cycle, the buffer controller 31 transmits a standby signal (a ready[0] signal) (an instruction signal) to the input controller 4 and buffers, in the FIFO 5, an image inputted from the image pickup unit 22.

The image processing apparatus 21A in the second embodiment further includes a region processing circuit 6 as an image processing circuit. The region processing circuit 6 is a circuit that performs processing of a plurality of regions of interest in one image. The region processing circuit 6 is provided between the distortion correction circuit 1 and the output buffer circuit 3. Examples of the plurality of regions of interest include a region of an entire image, which is acquired by a certain image pickup unit, for example, the image pickup unit 22a, and a partial region in a center of the image. However, the plurality of regions of interest are not limited to this example. Any regions of the image can be set as the regions of interest.

FIG. 14 shows an example in which the region processing circuit 6 performs two kinds of region processing on one image. More specifically, the region processing circuit 6 includes a region processing circuit[0] 6a that processes a certain region[0] in one image and a region processing circuit[1] 6b that processes another region[1] in the same image.

The region processing circuit[0] 6a performs processing when a pixel subjected to distortion correction by the distortion correction circuit t is a pixel included in the certain region[0] and outputs the pixel to the output buffer circuit 3 together with a region ID indicating that the pixel is a pixel relating to the region[0].

The region processing circuit[1] 6b performs processing when the pixel subjected to distortion correction by the distortion correction circuit 1 is a pixel included in the other region[1] and outputs the pixel to the output buffer circuit 3 together with a region ID indicating that the pixel is a pixel relating to the region[1].

Note that the pixel subjected to distortion correction by the distortion correction circuit 1 is included in only the certain region[0], included in only the other region[1], included in both of the certain region[0] and the other region[1], or not included in both of the certain region[0] and the other region[1]. When the pixel is included in both of the certain region[0] and the other region[I], the pixel is individually outputted from both of the region processing circuit[0] 6a and the region processing circuit[1] 6b to the output buffer circuit 3 together with the region IDs of the certain region[0] and the other region[1].

When storing sub-blocks in entries of respective stages layered in two or more stages, the output buffer circuit 3 adds tag information including addresses, camera IDs (camIDs), and region IDs (roiIDs) for identifying a region of interest to the sub-blocks and stores the sub-blocks.

FIG. 15 is a diagram showing an example of tag information attached to sub-blocks in an output buffer.

As shown in FIG. 15, tag information (tag[0], tag[1], . . . ) is respectively attached to sub-blocks (block[0], block[1], . . . ). The tag information includes addresses, camera IDs (camIDs), and region IDs (roiIDs).

When generating a transmission block from the sub-blocks, the buffer controller 31 adds tag information including an address, a camera ID (camID), and a region ID (roiID) to the transmission block and transmits the transmission block to the DRAM 24 through the bus 23.

When the camera ID indicates an image from the image pickup unit[0] 22*a* and the region ID indicates an image of the certain region[0], the DRAM 24 stores the transmission block in a memory[0, 0] 24*a*1, which is a storage region, according to the control by the CPU 25.

When the camera ID indicates an image from the image pickup unit[0] 22*a* and the region ID indicates an image of the other region[1], the DRAM 24 stores the transmission block in a memory[0, 1] 24*a*2, which is a storage region, according to the control by the CPU 25.

When the camera ID indicates an image from the image pickup unit[1] 22*b* and the region ID indicates an image of the region[0], the DRAM 24 stores the transmission block in a memory[1, 0] 24*b*1, which is a storage region, according to the control by the CPU 25.

When the camera ID indicates an image from the image pickup unit[1] 22*b* and the region ID indicates an image of the other region[1], the DRAM 24 stores the transmission block in a memory[1, 1] 24*b*2, which is a storage region, according to the control by the CPU 25.

As in the first embodiment, storage addresses in the memory[0, 0] 24*a*1, the memory[0, 1] 24*a*2, the memory[1, 0] 24*b*1, and the memory[1, 1] 24*b*2 are controlled by the CPU 25 based on the address of the tag information.

According to the second embodiment explained above, substantially the same effects as the effects in the first embodiment are achieved. Further, when processing of a plurality of regions of interest is performed on at least one image among a plurality of images, the buffer controller 31 adds, to a sub-block, tag information further including a region ID for identifying a region of interest. Therefore, the output buffer circuit 3 is capable of buffering pixels of the plurality of regions of interest. Consequently, it is possible to improve efficiency of use of the output buffer circuit 3. It is unnecessary to provide the output buffer circuits 3 as many as the regions of interest. It is possible to reduce a circuit size and achieve a reduction in power consumption and cost.

The buffer controller 31 adds tag information further including a region ID for identifying a region of interest to a transmission block. Therefore, it is possible to store the transmission block in an appropriate address of an appropriate storage region of each image and each region of interest in the DRAM 24.

While certain embodiments have been described, these embodiments have been presented by way of example only, and are not intended to limit the scope of the inventions. Indeed, the novel devices described herein may be embodied in a variety of other forms; furthermore, various omissions, substitutions and changes in the form of the devices described herein may be made without departing from the spirit of the inventions. The accompanying claims and their equivalents are intended to cover such forms or modifications as would fall within the scope and spirit of the inventions.

What is claimed is:

1. An image processing apparatus comprising:
   an input controller configured to switch, line by line, an inputted image and input, line by line, a plurality of images generated by a plurality of image pickup units;
   an input buffer circuit configured to buffer inputs from the plurality of image pickup units;
   an image processing circuit configured to process, in a time division manner, the plurality of images generated by the plurality of image pickup units;
   an output buffer circuit configured to buffer the plurality of images processed by the image processing circuit in a unit of a block, which is a set of pixels, pixel positions of which are continuous, in one image; and
   a buffer controller configured to add, to the block, tag information including an address of a specific pixel included in the block and an identification ID of one of the plurality of image pickup units that generates an image including the block,
   wherein the image processing circuit further comprises a preprocessing circuit configured to perform demosaic processing on RAW images inputted from the plurality of image pickup units to generate RGB images,
   the image processing circuit processes, with pipeline processing, the plurality of images switched and inputted line by line from the input controller,
   the buffer controller monitors a rate of use of the output buffer circuit and, when an overflow of the output buffer circuit is predicted, outputs an instruction signal to the input controller, and
   according to the instruction signal, the input controller causes the input buffer circuit to buffer the inputs from the plurality of image pickup units and controls the input buffer circuit to output the inputs to the image processing circuit with a delay.

2. The image processing apparatus according to claim 1, wherein
   the image processing circuit includes a region processing circuit configured to perform processing of a plurality of regions of interest in the one image, and
   the buffer controller adds, to the block, the tag information further including a region ID for identifying each of the regions of interest.

3. The image processing apparatus according to claim 1, wherein the image processing circuit includes a distortion correction circuit configured to correct distortion of the plurality of images.

4. The image processing apparatus according to claim 3, wherein
   the image processing circuit further includes, in a pre-stage of the distortion correction circuit, the preprocessing circuit, and
   the input buffer circuit is provided further on a pre-stage side than the preprocessing circuit.

5. The image processing apparatus according to claim 1, wherein
   the output buffer circuit includes a plurality of output buffers layered in two or more stages and sequentially performs, after all pixels in a block stored in the output buffer in a certain stage are collected, transferring the pixels to the output buffer in a next stage, and couples a plurality of blocks, in which all pixels of the output buffers in one or more stages including the output buffer in a last stage are collected, to generate a transmission block, and
   the buffer controller adds, to the transmission block, tag information including an address of a specific pixel included in the transmission block and the identification ID and outputs the transmission block to the output buffer circuit.

6. An image processing method comprising:
   switching, line by line, an inputted image and inputting, line by line, a plurality of RAW images generated by a plurality of image pickup units;
   processing, with pipeline processing by an image processing circuit, the plurality of RAW images switched and inputted line by line;

performing demosaic processing on the plurality of RAW images generated by the plurality of image pickup units to generate a plurality of images which are RGB images;

processing, in a time division manner by the image processing circuit, the plurality of images;

buffering, in an output buffer circuit, the processed plurality of images in a unit of a block, which is a set of pixels, pixel positions of which are continuous, in one image;

monitoring a rate of use of the output buffer circuit and, when an overflow of the output buffer circuit is predicted, outputting an instruction signal;

according to the instruction signal, buffering inputs from the plurality of image pickup units in an input buffer circuit and controlling to output the inputs from the input buffer circuit to the image processing circuit with a delay; and adding, to the block, tag information including an address of a specific pixel included in the block and an identification ID of one of the plurality of image pickup units that generates an image including the block.

* * * * *